United States Patent
Boehnke et al.

(10) Patent No.: US 8,027,282 B2
(45) Date of Patent: Sep. 27, 2011

(54) HETEROGENEOUS WIRELESS DATA TRANSMISSION NETWORK

(75) Inventors: Ralf Boehnke, Esslingen (DE); Juan Nogueira-Nine, Stuttgart (DE); Volker Wullich, Stuttgart (DE); Oliver Kraemer, Stuttgart (DE); Ingo Ruhm, Vierkirchen (DE); Zhaocheng Wang, Stuttgart (DE); Jochen Rebmann, Backnang (DE)

(73) Assignee: Sony Deutschland GmbH, Berlin (DE)

( * ) Notice: Subject to any disclaimer, the term of this patent is extended or adjusted under 35 U.S.C. 154(b) by 656 days.

(21) Appl. No.: 10/583,098

(22) PCT Filed: Dec. 17, 2004

(86) PCT No.: PCT/EP2004/014434
§ 371 (c)(1),
(2), (4) Date: Jun. 16, 2006

(87) PCT Pub. No.: WO2005/060164
PCT Pub. Date: Jun. 30, 2005

(65) Prior Publication Data
US 2007/0115827 A1    May 24, 2007

(30) Foreign Application Priority Data
Dec. 19, 2003    (EP) .................................. 03029448

(51) Int. Cl.
*G08C 17/00*    (2006.01)
(52) U.S. Cl. ....... 370/311; 370/338; 340/10.3; 340/505; 340/539.3; 455/507
(58) Field of Classification Search .................. None
See application file for complete search history.

(56) References Cited

U.S. PATENT DOCUMENTS

| | | | |
|---|---|---|---|
| 4,685,149 A | | 8/1987 | Smith et al. |
| 5,252,979 A | * | 10/1993 | Nysen .............................. 342/50 |
| 5,640,151 A | * | 6/1997 | Reis et al. ..................... 340/10.2 |
| 5,790,946 A | * | 8/1998 | Rotzoll ....................... 455/343.1 |
| 6,122,329 A | | 9/2000 | Zai et al. |
| 6,177,861 B1 | * | 1/2001 | MacLellan et al. .......... 340/10.1 |
| 6,192,230 B1 | * | 2/2001 | van Bokhorst et al. ..... 455/343.3 |
| 6,304,556 B1 | * | 10/2001 | Haas .............................. 370/254 |

(Continued)

FOREIGN PATENT DOCUMENTS

EP    1 220 499    7/2002

(Continued)

OTHER PUBLICATIONS

I. F. Akyildiz, et al., "Wireless sensor networks: a survey", Computer Networks, 38, 2002, pp. 393-422.

(Continued)

*Primary Examiner* — Daniel J Ryman
*Assistant Examiner* — Brian Roberts
(74) *Attorney, Agent, or Firm* — Oblon, Spivak, McClelland, Maier & Neustadt, L.L.P.

(57) ABSTRACT

A heterogeneous wireless network topology suited for low-power, short-range and ubiquitous ad-hoc communication. The network topology integrates different wireless transmission technologies, in particular to a wireless sensor network including different node types and communication technologies. The network is highly heterogeneous and can be operated according to the master-slave principle. The nodes can have different wireless communication means tailored to their individual role in the network and other constraints, thus allowing different communication patterns.

16 Claims, 14 Drawing Sheets

U.S. PATENT DOCUMENTS

| | | | |
|---|---|---|---|
| 6,735,448 B1 * | 5/2004 | Krishnamurthy et al. | 455/522 |
| 7,319,867 B2 * | 1/2008 | Li | 455/420 |
| 2001/0050922 A1 * | 12/2001 | Tiernay et al. | 370/467 |
| 2002/0004370 A1 | 1/2002 | Stengele et al. | |
| 2002/0034959 A1 * | 3/2002 | Jamieson et al. | 455/517 |
| 2002/0064134 A1 * | 5/2002 | Lee et al. | 370/252 |
| 2002/0075940 A1 | 6/2002 | Haartsen | |
| 2002/0127970 A1 | 9/2002 | Martinez | |
| 2003/0058886 A1 | 3/2003 | Stanforth et al. | |
| 2003/0099212 A1 | 5/2003 | Anjum et al. | |
| 2003/0104848 A1 | 6/2003 | Brideglall | |
| 2003/0151513 A1 * | 8/2003 | Herrmann et al. | 340/573.1 |
| 2003/0198196 A1 * | 10/2003 | Bahl et al. | 370/311 |
| 2004/0056091 A1 * | 3/2004 | Overhultz et al. | 235/382 |
| 2005/0156039 A1 * | 7/2005 | Carrender et al. | 235/439 |

FOREIGN PATENT DOCUMENTS

| | | |
|---|---|---|
| EP | 1 246 094 A1 | 10/2002 |
| WO | WO 01/39103 A1 | 5/2001 |
| WO | WO 03/025774 A1 | 3/2003 |
| WO | WO 03/077480 A1 | 9/2003 |

OTHER PUBLICATIONS

Ian . F. Akyildiz, et al., "A Survey on Sensor Networks", IEEE Communications Magazine, Aug. 2002, pp. 102-114.

"FCC 15.247 Operation within the bands 902-928 MHz, 2400-2483.5 MHz, and 5725-5850 MHz.", Federal Communications Commission, 47 CFR Ch. I (10/1-01 Edition) pp. 733-735.

Tod Riedel, et al., "Wireless Sensors Streamline Data Distribution", Communication Systems Design, Jul./Aug. 2003, www.CommsDesign.com, pp. 10, 11,12, 14,16,17, and page 2.

Electromagnetic compatibility and Radio spectrum Matters (ERM): Wideband Transmission systems; Data transmission equipment operating in the 2,4 GHz ISM band and using spread spectrum modulation techniques; Harmonized EN covering essential requirements under article 3.2 of the R&TTE Directive, final draft ETSI EN 300 328 V1.4.1, Nov. 2002, 1-36.

Bob Metcalfe, "Ember" ZigBee Wireless Networking Systems-Ember, http://www.ember.com/, 2007, 2 pages.

\* cited by examiner

FIG 2

| Node | Comm. Units | PU → SA A2P | PU → PU A2A | SA → SA A2A | PU ← SA MBS | PU ← SA A2A | PU ← SA MBS | PU → SP A2P | PU ← SP MBS | SA → SP A2P |
|---|---|---|---|---|---|---|---|---|---|---|
| PU | Active Tx | ✓ | ✓ | | | | | | | |
| | Active Rx | | ✓ | | | | | ✓ | | |
| | Ether Provider | | | | | | ✓ | | ✓ | |
| | Wake-up Whistle | ✓ | | | | | | ✓ | | |
| SA | Active Tx | ✓ | | ✓ | | ✓ | | | | ✓ |
| | Passive Rx | | | ✓ | | | | | | |
| | Passive Tx | ✓ | | | | ✓ | ✓ | | | |
| | Wake-up Whistle | | | ✓ | | ✓ | ✓ | | | |
| | Wake-up Listener | ✓ | | ✓ | | | | | | |
| SP | Passive Rx | | | | | | | | | ✓ |
| | Passive Tx | | | | | | | ✓ | ✓ | ✓ |
| | Wake-up Listener | | | | | | | ✓ | | ✓ |

FIG 3

| Link | Range | Type of Data | Communication Units | Graphical Representation |
|---|---|---|---|---|
| PU→SP (A2P) | Short | Configuration and operation data. Activation messages (wake up). | PU: Active Tx<br>PU: Wake-up Wh.<br>SP: Passive Rx<br>SP: Wake-up L. |  |
| PU←SP (MBS) | Short | Sensor data. Identification data. | PU: Ether provider<br>PU: Active Rx<br>SP: Passive Tx | 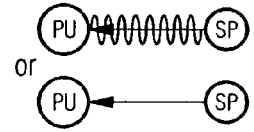 or 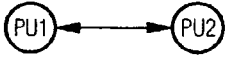 |
| PU↔PU (A2A) | Medium | Network management messages. Sensor data. | PU: Active Tx<br>PU: Active Rx |  |
| PU→SA (A2P) | Short | Configuration and operation data. Activation messages (wake up). Sensor data | PU: Active Tx<br>PU: Wake-up W.<br>SA: Passive Rx<br>SA: Wake-up L. |  |
| SA↔SA (A2P) | Short | Activation messages (wake up). Sensor data. | SA1: Active Tx<br>SA1: Wake-up W.<br>SA2: Passive Rx<br>SA2: Wake-up L. | |
| SA→SP (A2P) | Short | Configuration and operation data. Activation messages (wake up). | SA: Active Tx<br>SA: Wake-up W.<br>SP: Passive Rx<br>SP: Wake-up L. | |
| SA→PU (A2A) | Medium | Sensor data. Identifikacion data. | SA: Active Tx<br>PU: Active Rx | |
| SA→PU (MBS) | Short | Sensor data. Identifikacion data. | PU: Ether provider<br>PU: Active Rx<br>SA: Passive Tx | 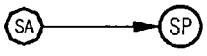 or 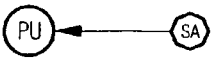 |
| SP→PU (MBS) | Short | Sensor data. Identifikacion data. | PU: Wake-up W.<br>PU1: Ether provider<br>PU2: Active Rx<br>PU1: Active Tx<br>SP: Passive Rx<br>SP: Wake-up L.<br>SP: Passive Tx | 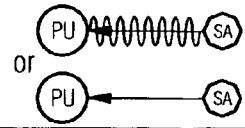 |
| SP→PU (MBS) | Short | Sensor data. Identifikacion data. | PU2: Wake-up W.<br>PU2: Ether provider<br>PU2: Active Rx<br>PU2: Active Tx<br>PU1: Active Rx<br>SP: Passive Rx<br>SP: Wake-up L.<br>SP: Passive Tx | 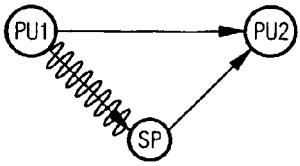 |

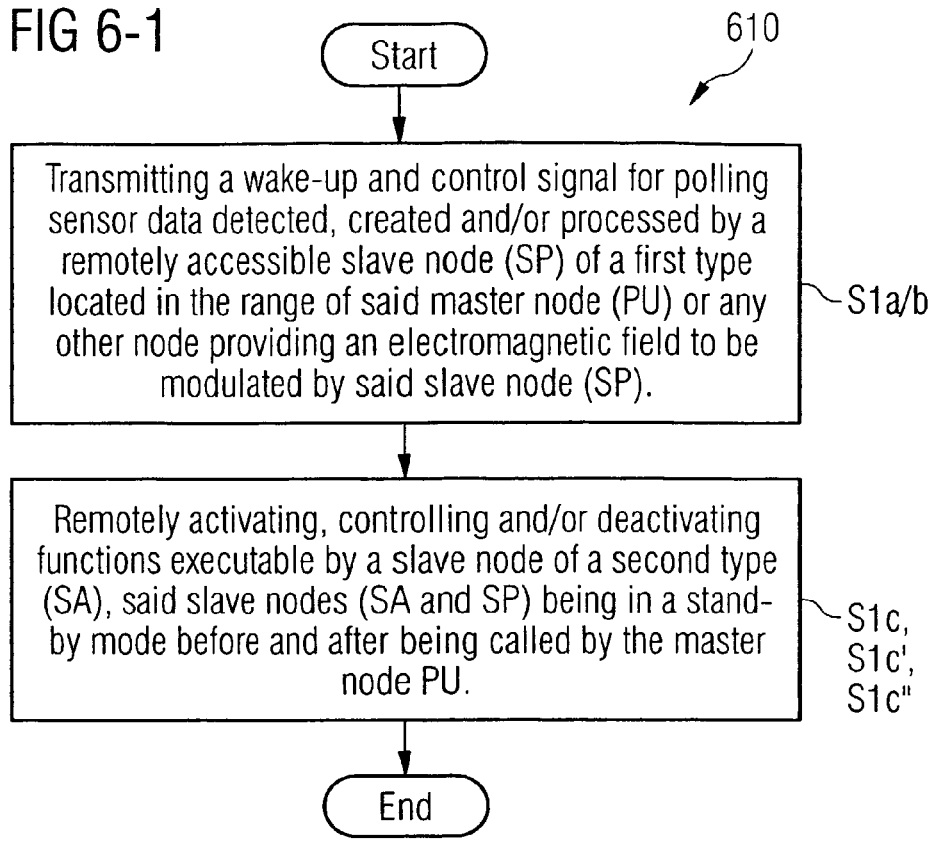
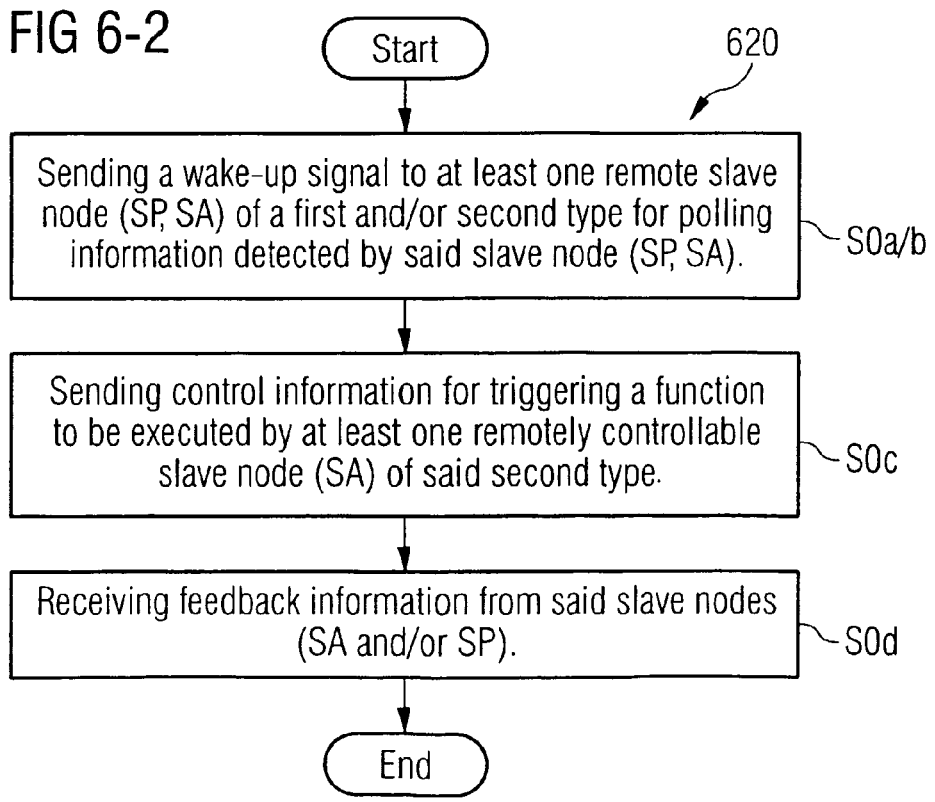

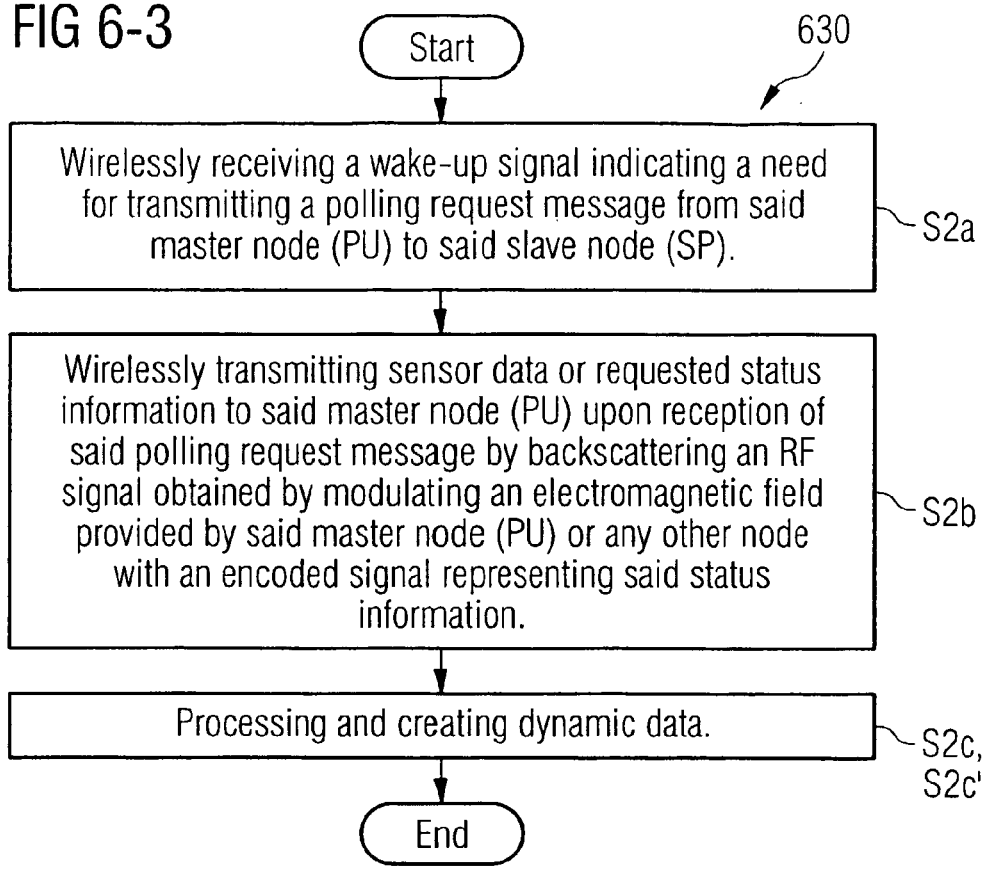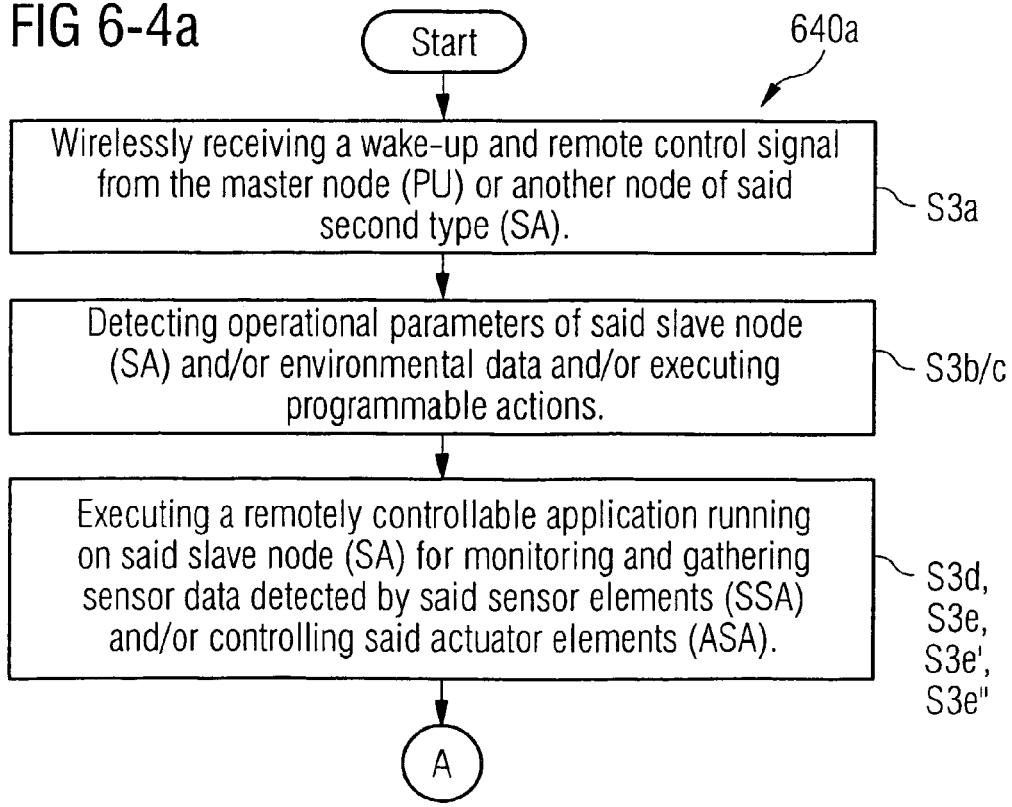

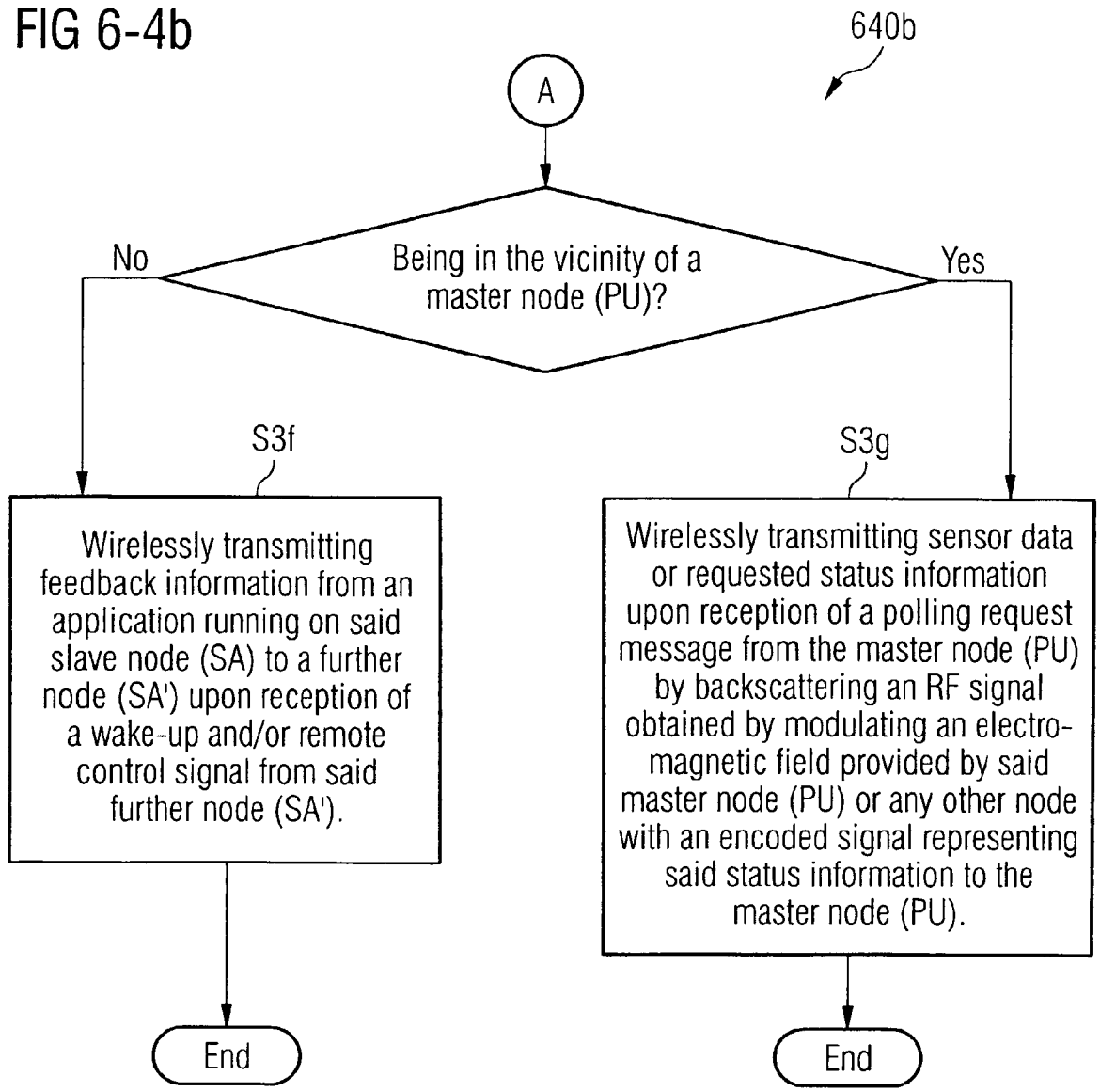

HETEROGENEOUS WIRELESS DATA TRANSMISSION NETWORK

FIELD AND BACKGROUND OF THE INVENTION

The present invention generally relates to the field of heterogeneous, wireless ad-hoc networks suitable for low-power, short-range and ubiquitous ad-hoc communication for fixed, embedded or portable devices, e.g. a wireless sensor network (WSN) for use e.g. in health care, intelligent household, industry, distributed computing or related applications.

A wireless ad-hoc communication network is typically based on ad-hoc multi-hop communications. The typical mode of communication in a sensor network is from multiple data sources to a data sink. During the lifetime of the network, the information collected by the sensors is periodically transmitted to the sink nodes, which can either be mobile or fixed. These sink nodes can be used by external operators to retrieve the information gathered by the network (gateway functionality). In addition, the wireless communication network enables communication and information exchange between any of the nodes participating in the network.

Since the data being collected by multiple sensors is often based on common phenomena, there is likely to be some redundancy in the raw or pre-processed data being communicated by the various nodes in sensor networks. Third, in most envisioned scenarios the sensors are not mobile (though the sensed phenomena may be), so the nature of the dynamics in both network types is different.

The single major resource constraint is that of energy for a small, embedded node hosting sensing and communication functions. The scale of sensor networks and the necessity of unattended operation for months at a time means that energy resources have to be managed even more carefully. This, in turn, typically precludes high data rate communication, long range wireless communication and any other type of complex data pre-processing Current systems typically employ conventional low-power radio technology or Bluetooth radio systems, which require a substantial amount of energy for transmission and reception. Therefore, even if the traffic pattern is very sporadic, both units (receiver and transmitter) are turned on from time to time, need to be synchronized and finally exchange information (if there is any information to be exchanged). Typically for short-range wireless devices, the reception unit takes the same power (or even higher power) as the transmission unit. Even if no information needs to be received, substantial power is wasted just to be able to receive data. In order to save as much power as possible, complex duty-cycle radio protocols are employed. Duty cycling raises another problem: Information can only be exchanged during 'on' time, where both the transmitter and the corresponding receiver are activated at the same instance of time. Therefore, in a typical duty-cycle protocol—e.g. with a 1% duty cycle, which means that e.g. a transceiver is switched on for 0.1 seconds and turned off for 9.9 seconds—messages may need to be delayed substantially.

Said low-power radio technology and said Bluetooth radio systems are typically employed for each type of node within a wireless sensor network. Therefore, even the simplest nodes (and those may be deployed massively) use the same kind of radio technology (which consumes substantial power and imposes a certain system cost). A more suitable wireless network system would allow scaling of the radio subsystem and the radio protocol according to the respective node's task. At least the scaling of the radio protocol and routing protocol is partially used in current systems (e.g. by defining end points, routers and gateways).

A suitable radio technology for certain nodes in a wireless network for wireless sensor applications can be "Modulated Backscatter" (MBS), which is currently used for short-range radio frequency identification (RFID) applications (e.g. smart card access control systems). As there is no need for a complicated radio (passive transmission), both the cost and energy consumption can be very low (for many nodes within a wireless network). However, current MBS applications are limited to RFID style operation and therefore do not support the following points:

Efficient networking: Currently, a single "reader" talks to a group of RFID tags, information is not provided within a network and "tag-to-tag" communication is not supported.

Only a fixed, pre-programmed ID is provided by the tag, which means that there is no dynamic information generated, processed and communicated from the tag.

MBS range and data rate are limited due to the limited application scenario of RFID and the technology implemented.

Interworking (both on radio and radio protocol) with other "longer-range" radio technologies (e.g. ISM band short-range radio systems such as Bluetooth). Thereby, sensor information can not be propagated across different radio technologies. In addition, both radio technologies have been designed with different scenarios in mind and are thus not compatible.

BRIEF DESCRIPTION OF THE PRESENT STATE OF THE ART

In order to understand the central idea of the present invention, it is necessary to give a brief survey of RFID systems, passive and active RFID tags.

Conventional wireless sensor networks utilize proprietary radio access technologies (or a modification of standard radio devices such as Bluetooth) and proprietary radio access protocols. As their network topology is typically meshed, they are able to support ad-hoc features (e.g. node detection, node identification and routing) without a central controlling device and can be tailored for a specific application (e.g. military surveillance, production or process surveillance). For further background information on sensor networks and specifically wireless sensor networks the interested reader is referred to the following articles: "Wireless Sensor Networks: A Survey" (Computer Networks 38 (2002), pp. 393-422, 2002, published by Elsevier Science B.V.) by I. F. Akyildiz, W. Su, Y. Sankarasubramaniam, and E. Cayirci, "A Survey on Sensor Networks" (IEEE Communication Magazine, August 2002) by the same authors, and "Wireless Sensors. Streamline Data Distribution" (Communication System Design, July/August 2003) by T. Riedel.

For the scope of the present invention, the following topics shall briefly be discussed here: wireless network topologies (suitable for sensor applications), radio access technologies and radio protocol architectures.

To allow simple deployment, typically ad-hoc network topologies are supported, where each node can participate within the network and furthermore assume different roles within the network. Thereby, a wireless node equipped with a sensor device acts as a data collector (for sensing local information) or utilizes the wireless interface to receive and retransmit ("forwarding" or "routing") information from remote wireless nodes. Other specific nodes (routers) which are not equipped with sensing devices are used to route the traffic through the network. Furthermore, a so-called gateway node provides an interface between the sensor network and the outside world (e.g. towards an observer). Another scenario is constructed using a single observer/gateway node and multiple wireless (sensor) nodes. In this case, the gateway node acts as a central controller and polls the wireless sensor nodes (star topology, centralized master-slave type of operation).

Current wireless (sensor) networks usually apply bidirectional radio technology, thereby targeting low-power operation while fulfilling regional radio regulatory constraints. For example, ISM radio bands are utilized to allow rapid deployment of such systems.

A typical example are the Bluetooth radio interface or other technologies fulfilling the regulatory conditions described in "FCC 15.247 Operation within the Bands 902-928 MHz, 2400-2483.5 MHz, and 5725-5850 MHz" and "Electromagnetic Compatibility and Radio Spectrum matters (ERM); Wideband Transmission Systems, Data Transmission Equipment Operating in the 2.4-GHz ISM Band and Using Spread-Spectrum Modulation Techniques; Harmonized EN Covering Essential Requirements under Article 3.2 of the R&TTE Directive" (ETS 300 328, November 2002).

In RFID applications according to the state of the art MBS is a typically used radio technology for the communication link between a variety of passive "tags" and a "reader" unit (a so-called "interrogator"). The reader unit is typically more complex and supports a larger number of tags within the radio range of the reader. The principle of operation is as follows: The reader sends an activation signal (or a continuous wave signal) to the tags, thereby providing an electromagnetic field in an area around the reader, whereupon the tags identify the presence of the electromagnetic field and use a passive transmission technology (e.g. a variation of the antenna impedance matching) to slightly influence (modulate) the electromagnetic field (EM field disturbance). The reader is able to detect the variation of the electromagnetic field, which contains the information transmitted from the tags. To allow a simple communication link to the tags, typically a high-power signal (e.g. an amplitude-modulated signal) is transmitted from the reader to the tags in range and demodulated on the tag side by means of e.g. a simple diode detector (which does not require an active down-conversion stage comprising at least one down-conversion mixer and a local oscillator). However, sensitivity and selectivity of the diode detector are limited, thus limiting the range.

Problems to be Solved by the Invention

A major problem is that integrated network topologies and radio technologies have not yet been adapted to the requirements of heterogeneous wireless networks, e.g. usable for sensor network applications.

Although having balanced radio complexity in each node, conventional active-radio based sensor networks do not address the need to include very low-cost wireless nodes in the network. At the same time, power consumption can be significant or has to be compensated by complex (duty-cycle) access protocols (which may introduce significant message delays). However, these networks may allow a significant communication range (less dense sensor networks, as the radio may allow transmission over typically up to 100 meters in free space). On the other hand, RFID technology is limited in network topology (star only), networking (tag-reader only), range (typically less than one meter) and limitation to short, fixed/static (pre-programmed) information (e.g. ID).

OBJECT OF THE PRESENT INVENTION

In view of the explanations mentioned above, it is the object of the invention to propose a technique which is specially adapted to the requirements of heterogeneous low data rate wireless networks, e.g. suitable for sensor applications.

This object is achieved by means of the features of the independent claims. Advantageous features are defined in the dependent claims. Further objects and advantages of the invention are apparent in the following detailed description.

SUMMARY OF THE INVENTION

The present invention is basically dedicated to a wireless network, in particular to a wireless sensor network (WSN) supporting three different node types and communication technologies. Thereby, a node is basically defined by its role in the network (e.g. coordinator unit in a star topology) and its communication possibilities (defined by the capabilities of the utilized radio units). In addition, the applied radio communication protocol elements differ according to the respective node type. The network can be heterogeneous and operated according to the master-slave or ad-hoc principle. Said nodes can have different wireless communication means tailored to their individual role in the network and other constraints, thus allowing different communication patterns.

In contrast to conventional wireless ad-hoc systems and wireless sensor systems, where typically a single node type (when defined by a radio communication unit and its associated radio protocol) is supported (e.g. Bluetooth or Zigbee) and certain nodes may additionally provide a gateway function to interconnect to e.g. the Ethernet or another wireless technology (e.g. WLAN), the proposed network architecture supports three distinct node types using different wireless communication units and different protocol components.

The present invention further proposes a wake-up signaling method for activating a group of nodes or a single node when required, e.g. for polling information from activated nodes, remotely controlling an activated node or indicating a need to send data to an activated node. For this purpose, said network comprises at least one node of a first class of nodes which is adapted to transmit a wake-up signal through the network and at least one node of a second class of nodes which is adapted to receive said wake-up signal by means of a low-power consumption receiver and to initiate a data transfer following the wake-up signal.

BRIEF DESCRIPTION OF THE DRAWINGS

Further advantages and possible applications of the underlying invention result from the subordinate claims as well as from the following description of the preferred embodiment of the invention which is depicted in the following drawings:

FIG. 2 shows that communication units need to be activated by each node taking part in a wireless sensor network, thereby identifying three distinct node types defined by different communication units and capabilities, FIG. 3 is a table showing different types of data being exchanged between polling units, simple active and passive units in a wireless sensor network, FIG. 4-1 shows the activation and reading phases of a polling process in a wireless sensor network where a single polling unit and one simple passive unit are involved in a modulated backscatter procedure, FIG. 4-2 shows the activation, coordination and reading phases of a polling process in a wireless sensor network where two polling units and one simple passive unit are involved in a modulated backscattering procedure, FIG. 4-3 shows a wireless sensor network, said network being configured in a star topology, encompassing a variety of simple active and passive nodes communicating with a polling unit via active-to-active (A2A), active-to-passive (A2P) and modulated backscatter communication links, respectively, FIG. 4-4 shows a message sequence chart of a passive nodes polling example, FIG. 4-5 is a diagram showing a wireless sensor network scenario, said network being configured in a meshed topology, encompassing a variety of simple active nodes communicating with each other, FIG. 4-6 is a diagram showing a wireless sensor network, said network being configured in a hybrid star and meshed topology, encompassing a variety of simple active nodes communicating with a polling unit via active-to-active (A2A) and asymmetric communication links and communicating with a variety of simple passive nodes via active-to-passive (A2P) communication links, FIG. 4-7 is a diagram showing a wireless sensor network, said network being configured in a hybrid star and meshed topology, encompassing a variety of simple active nodes communicating with a polling unit via active-to-active (A2A) and asymmetric communication links, FIG. 4-8 is a diagram showing the phases of the polling procedure, FIG. 4-9 shows a "smart bookshelf" scenario where a wireless sensor network is used to identify which books are in its shelves and furthermore to provide some information about their positions in the bookshelf, FIG. 4-10 is a diagram which illustrates how a first wireless sensor network deployed in a body area network (BAN) style can automatically be linked to a second wireless sensor network deployed in the home of the BAN's user, FIG. 5-1 is a block diagram showing the basic node architecture (valid for all applied node types), FIG. 5-2 is a further block diagram showing a special node architecture featuring a gateway unit which serves as an interface between heterogeneous networks (valid for polling units), FIG. 5-3 shows four block diagrams illustrating different configurations of remotely controllable nodes equipped with sensor and/or actuator elements, FIG. 5-4 is a block diagram showing the configuration of a radio communication unit realizing a polling unit according to the present invention, FIG. 5-5 is a further block diagram showing the configuration of a radio communication unit realizing a remotely controllable simple passive node according to the present invention, FIG. 5-6 is a still further block diagram showing the configuration of a radio communication unit realizing a remotely controllable simple active node according to the present invention, FIG. 5-7 is a timing diagram showing the process of stepwisely activating a remotely controllable simple passive or simple active node being in a stand-by mode before being activated and detecting ID information and control data, FIG. 5-8 is a state transition diagram illustrating the steps of node activation, ID information and control data detection performed by a remotely controllable simple passive or simple active node, and FIGS. 6-1 to 6-4b are five flow charts illustrating the procedure of enabling at least one master node (PU) of a remote polling and control system in a heterogeneous wireless network according to the present invention to remotely control at least one slave node (SA, SP).

DETAILED DESCRIPTION OF THE PRESENT INVENTION

Figure 1:
FIG. 1 shows different types of communication links between the nodes in a wireless sensor network.

In the following, the preferred embodiment of the underlying invention as depicted in FIGS. 1 to 6-4b shall be explained in detail.

The proposed network can be e.g. a wireless network described by different node types (classes), node communication possibilities, communication technologies employed (in different scenarios and configurations), radio features and Media-Access-Control Layer (MAC-layer) technologies.

In the proposed network nodes are characterized by their role within the network, their communication capabilities, and their supported wireless (radio) technology (which comprises e.g. the applied modulation scheme) or utilized wireless communication units.

According to the invention, e.g. four different node classes (defined by their radio communication unit configuration) can be used, which are not mutually exclusive: active transmitters (aTx), active receivers (aRx), passive transmitters (pTx) and passive receivers (pRx).

An active transmitter (aTx) is a transmission unit which is capable of transmitting a modulated RF signal by its own. By contrast, a passive transmitter (pTx) is only capable of modulating and reflecting external RF signals based on MBS principle. A passive receiver (pRx) is a low-power consumption but low-sensitivity reception unit which can e.g. be realized as a diode detector, whereas an active receiver (aRx) is a reception unit with high sensitivity capable of demodulating backscattered signals as well as any modulated RF signal received from an active transmitter.

Furthermore, two special units are available in particular nodes within the network: a so-called "wake-up whistle" unit and a so-called "wake-up listener" unit.

A wake-up whistle unit is a radio transmitter sending a specific signal to "wake-up" nodes in its vicinity—a signal received by means of a passive receiver which indicates the start of any communication to the receiver. A wake-up listener unit is typically implemented as a passive receiver which is tuned and capable of receiving or identifying a wake-up whistle signal. This wake-up signaling scheme is an essential means to allow communication based on an "alwayson" receiver network architecture. In this connection, a stepped node activation mechanism is used:

First, said nodes are typically in a "sleep" state and waiting to receive a wake-up signal. After detection of a wake-up signal the receiver switches to an "ID identification" mechanism. After successful detection of a valid identification (e.g. node address match) the nodes then turn into a data reception mode. If an invalid ID is detected, the node immediately returns to the sleep state. During data reception mode further stages may be turned active in the receiver. Thereby, power consumption is kept minimal and only increases in a stepwise manner during the reception of a wake-up signal sequence.

The whole step-by-step activation scheme is designed to support the following important features:

minimum power consumption during idle times (when waiting for a wake-up),

"always-on" receiver mode, wherein each node can be activated via a remote wake-up signal at any time (without duty cycling of the receiver, which means toggling between insensitive and sensitive state), and stepwise activation of different units with the receiver after detection of a wake-up signal, thereby tailoring the power consumption and stepwise increasing the power consumption as needed during wake-up, ID detection, and data detection.

The proposed network architecture supports the following communications in different nodes: unidirectional reception mode (a receiver-only functionality), unidirectional transmission mode (a transmitter-only functionality), bidirectional transmission mode (a switchable transceiver functionality supporting both transmission and reception, but not at the same time), and a switchable transmitter functionality (using one or another transmitter in a specific node type depending on the topology).

Concerning data handling, the following entities have to be distinguished: producer, aggregator and observer.

A producer is a device which generates data by its own (e.g. a device with integrated sensors or any other type of dynamic information created in the node) or by means of user interactions (e.g. a device with a push button). An aggregator is a device which is able to collect and process data received from other devices. Said collection can be intelligent (e.g. data fusion support) or simple (e.g. concatenation of individual measurements to bigger packets). An observer is a device which uses the data provided by the producers for some useful application.

Furthermore, nodes with different capabilities within the network have to be distinguished: forwarders and non-forward-ers. A forwarder is a node which is capable of forwarding (routing) other nodes' data. By contrast, a non-forwarder is a node which is not capable of forwarding data.

In the proposed wireless sensor network the following three node classes, each having different capabilities, have to be identified: polling units (PUs), simple passive nodes (SPs) and simple active nodes (SAs).

A polling unit (PU) is a node which is equipped with an active transceiver unit (aTx and aRx). It is able to send and receive data by its own and demodulate the backscattered signals coming from simple passive nodes (SPs) as well as any transmission from an active transmitter (aTx). It can also use its active transmitter to provide an electromagnetic field which is necessary for an MBS communication. In this case the PU is acting as an ether provider. Thereby, said ether is an unmodulated carrier provided by the PU, which is modulated by a remotely controllable simple passive node using a passive transmitter (see explanations below). With the aid of an integrated wake-up whistle unit a PU can wake up any device having a wake-up listener unit in its range.

PUs may also come with an additional module (e.g. a bridge B) to talk with other PUs that are out of their immediate range. A bridge may consist of a long-range wireless module (different RF technology than the one used in the PUs) or even a wired connection to e.g. interface with the Ethernet.

A simple passive node (SP) is a short-range device or node equipped with a passive transmitter (pTx) based on MBS technology and a passive receiver (pRx), e.g. a diode detector. An SP uses MBS technology to transmit its information and is thus not able to work without the presence of a PU. A signal coming from the PU is modulated with the dynamic information generated and stored in its memory and then modulated in the passive radio transmission unit of the SP. As an integrated wake-up listener unit is active all the time, the SP can be awaked by any device having a wake-up whistle unit if the SP is within its range. The information transfer from an SP to the PU thus happens after an initial data transfer from the PU to the SP, which involves sending a wake-up signal and e.g. a command signal to the SP. During the data transfer between the SP and the PU, which is based on MBS technology, an ether (provided by the PU) is modulated by the SP, thereby using a passive transmitter (pTx).

It should be noted that these SPs are not similar to RFID tags. RFID tags are typically energized during the communication by a reader signal, thereby generating the power required to modulate the tag antenna by the received interrogation signal by using MBS technology. In the proposed network SPs have their own power (which is provided e.g. by a small battery) and do not use the interrogating signal to generate energy required in order to modulate the interrogating signal (ether). However, the ether is still needed as a modulation carrying medium. The SP nodes in the proposed network contain processing means to generate and process dynamic information. Typical RFID tags, however, usually do not contain any processing means to process and generate dynamic information; the information is a fixed, pre-programmed code.

A simple active node (SA) is a medium-range device or node which is equipped with an active transmitter (aTx), a passive receiver (pRx), e.g. a diode detector, and a passive transmitter (pTx) based on MBS technology. An SA may further comprise a wake-up listener unit and an optional wake-up whistle unit. It is able to transmit data actively or by using MBS technology. An SA further comprises processing means for executing (S3*d*) a remotely controllable application running on said node, e.g. for monitoring (S3*e*) and gathering (S3*e'*) information sensed by integrated sensor elements (SSA) and/or controlling (S3*e"*) integrated actuator elements (ASA).

Since SPs may also contain processing means, they have a very similar architecture as SA nodes. This means that both SAs and SPs require an own energy supply (e.g. a battery, a solar cell or other means) and basically differ in their radio communication means and communication capabilities as well as in their networking means: An SA has the same communication means as an SP and in addition some further means (e.g. an active transmitter and a wake-up whistle). Moreover, an SP can only communicate to a PU, whereas an SA is able to communicate to other SA nodes. Besides the basic radio means this mainly affects the implemented radio protocol components.

Figures 1, 4:
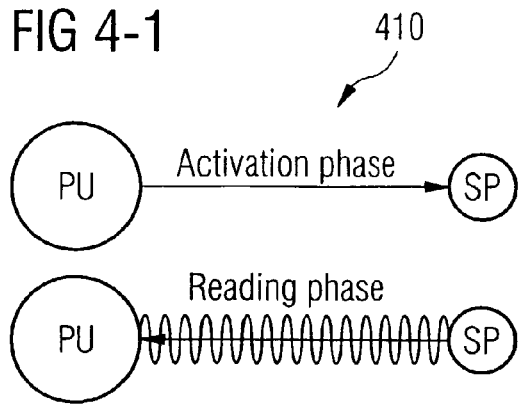
Figures 2, 4:
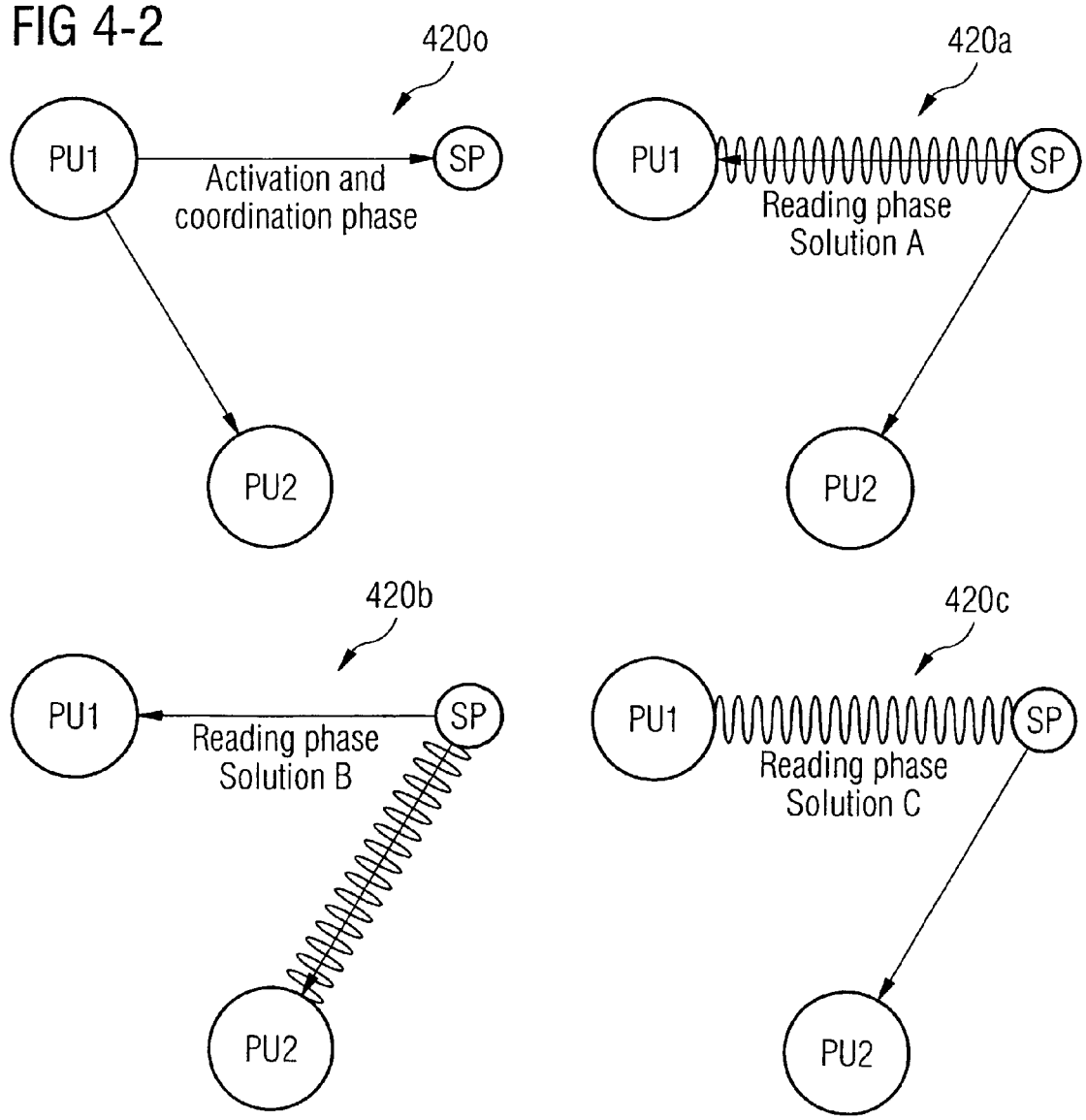
Figures 3, 4:
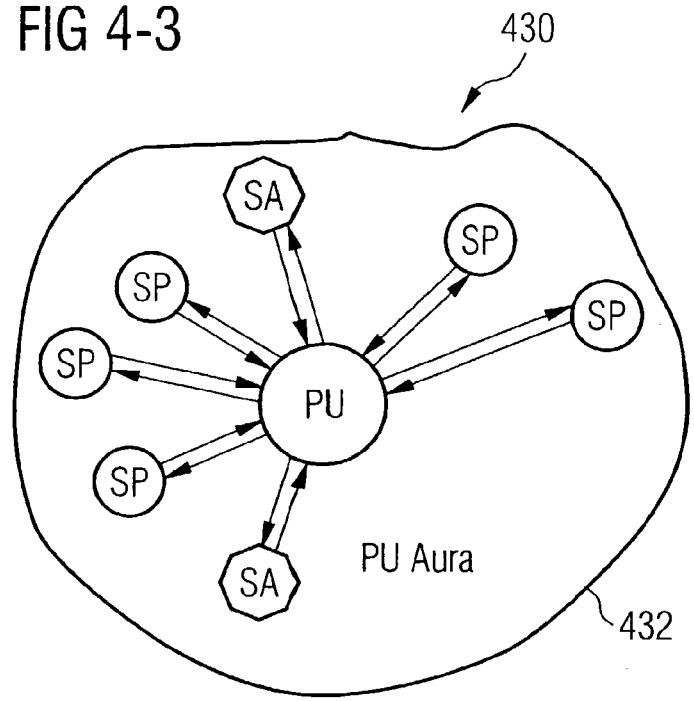
Figure 4:
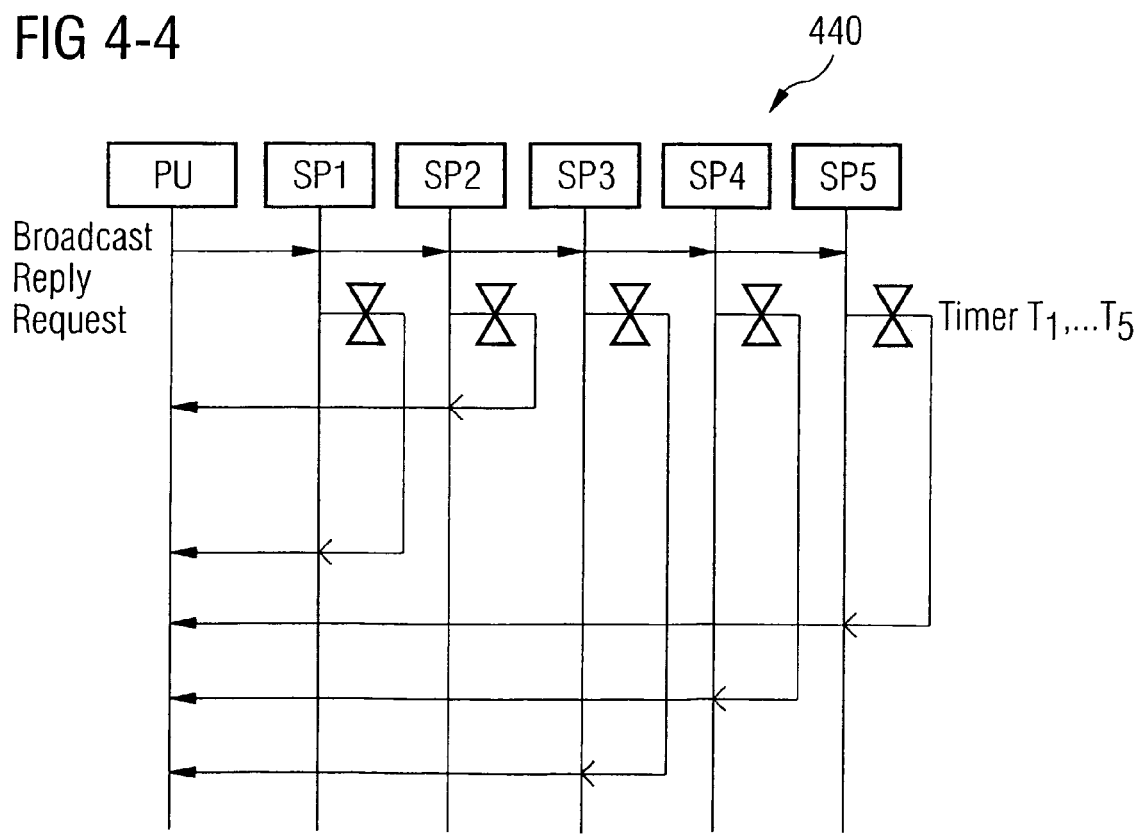
Figures 4, 5:
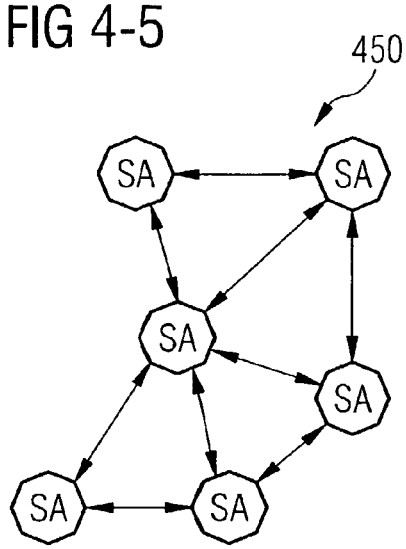

FIG. 5-1 shows the basic node architecture 510 according to the present invention, which is valid for all applied node types (PUs, SPs, and SAs). It comprises a processing unit 512 and a radio communication unit 514. Said processing unit is capable of creating, handling and processing dynamic information (not just a fixed, pre-programmed ID).

A special PU node architecture 520 providing a gateway unit serving as an interface between heterogeneous networks is shown in FIG. 5-2.

Four block diagrams 530*a-d* illustrating typical node type configurations of SPs and SAs equipped with sensor and/or actuator elements are depicted in FIG. 5-3. However, an SP or SA may also be configured without any sensing element or actuator element (see FIG. 5-1).

FIG. 5-4 is a block diagram 540 showing the configuration of a radio communication unit realizing a PU according to the present invention. As can be taken from this figure, a PU comprises the following four components:

- an active transmitter 542 (aTx) to actively generate a modulated carrier and thereby communicate to any other node in the network (including other PUs),
- an ether generator 548 to enable other nodes (only SAs or SPs) in the vicinity of the PU to utilize their passive transmitter (pTx) for communication to the PU,
- an active receiver 544 (aRx) to receiver either MBS-type communication while e.g. receiving information from an SP, which uses its passive transmitter (pTx), MBS-type communication while e.g. receiving information from an SA, which uses its passive transmitter (pTx), active transmitter type communication coming from another PU or active transmitter type communication coming from another SA, which in this case uses its active transmitter (aTx), and
- a wake-up whistle 546a to wake-up SAs and/or SPs (not PUs) in order to indicate the need to communicate to an SP or SA (or to a multiplicity thereof).

It should be noted that the active transmitter 542 (aTx) and the ether generator 548 can also be one common but reconfigurable unit as they would have common elements (e.g. power amplifiers, local oscillators, etc.) and are used mutually exclusive.

FIG. 5-5 is a further block diagram 550 showing the configuration of a radio communication unit realizing an SP according to the present invention. As can be taken from this figure, an SP comprises the following three elements:
- a passive receiver 554 (pRx), which means a simple low-power receiver being able to receive data from a PU communicating to the SP or from an SA communicating to the respective SP,
- a passive transmitter 552 (pTx), capable of performing MBS-type of communication to a PU which provides the ether to allow MBS communication and uses its active receiver (aRx) to detect the RF signal sent from the passive transmitter 552 (pTx) of said SP, wherein ether generation and active reception are not necessarily confined to the same PU, and
- a wake-up detector 546b, used to wake-up the node, which is remotely triggered by another PU or SA to initiate an action in the SP (or e.g. to indicate the start of a communication sequence to/from the SP).

Figures 4, 5, 6:
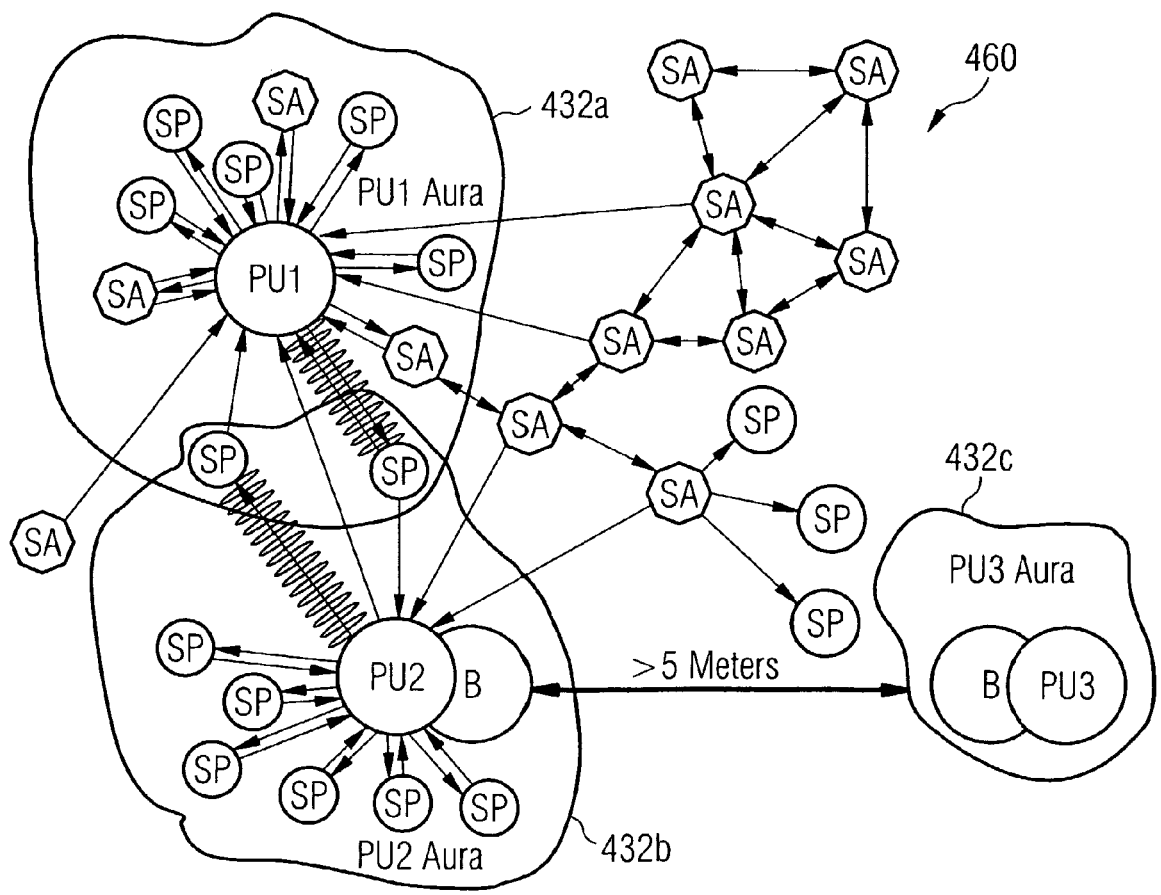

FIG. 5-6 is a still further block diagram 560 showing the configuration of a radio communication unit realizing an SA according to the present invention. As can be taken from this figure, an SA is equipped with the same radio communication elements as an SP and comprises some further elements. Thus, an SA comprises the following five components:
- a passive receiver 554 (pRx), which means a simple low-power receiver being able to receive data from a PU communicating to the SA or from an SA communicating to the respective SA,
- a passive transmitter 552 (pTx), capable of performing MBS-type of communication to a PU which provides the ether to allow MBS communication and uses its active receiver (aRx) to detect the RF signal sent from the passive transmitter 552 (pTx) of said SA,
- a wake-up detector 546b, used to wake-up the node, which is remotely triggered by another PU or SA to initiate an action in the SA (or e.g. to indicate the start of a communication sequence to/from the SA),
- a wake-up whistle 546a to wake-up SAs and/or SPs (not PUs) in order to indicate the need to communicate to an SP or SA (or to a multiplicity thereof), and
- an active transmitter 542 (aTx) to actively generate a modulated carrier and thereby communicate to any other node in the network (including other PUs).

It should be noted that said wake-up whistle 546a is a similar unit as the one available in the PU but may e.g. have some limitation compared to a PU's wake-up whistle unit. For example, an SA wake-up whistle implementation may have a limited output power compared to the one of a PU, thereby limiting the wake-up range. The active transmitter 542 (aTx) is a similar unit as the one available in the PU but may e.g. have some limitation compared to the active transmitter unit used in a PU. For example, an SA active transmitter implementation may have a limited output power compared to the one of a PU, thereby limiting the communication range of the active transmitter.

Figures 4, 5, 6, 7:
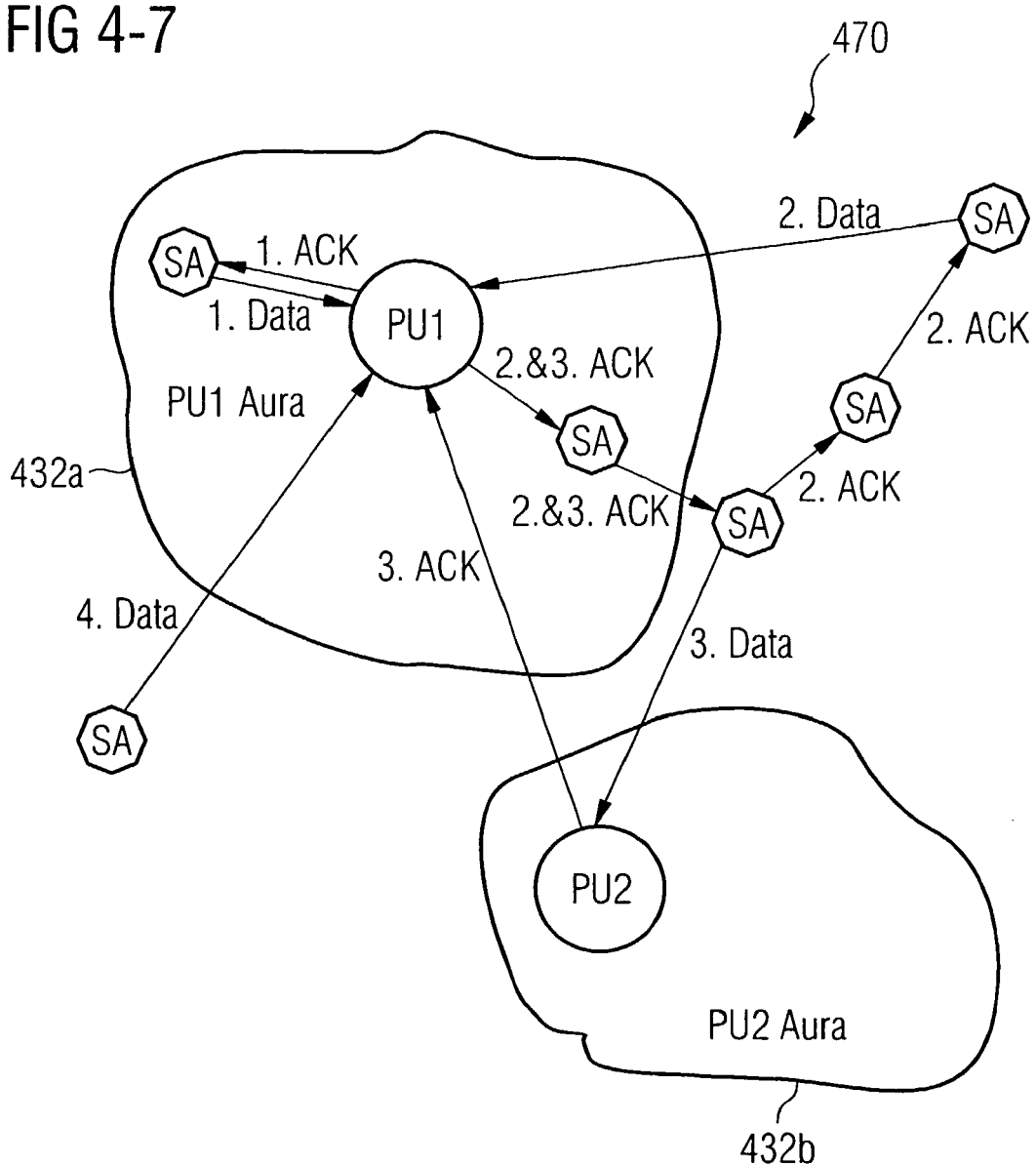
Figures 4, 5, 6, 7, 8:
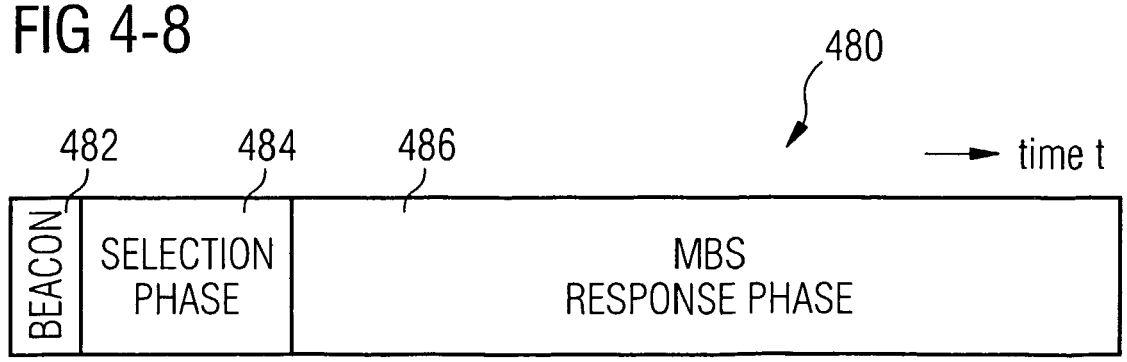
Figures 4, 5, 6, 7, 8, 9:
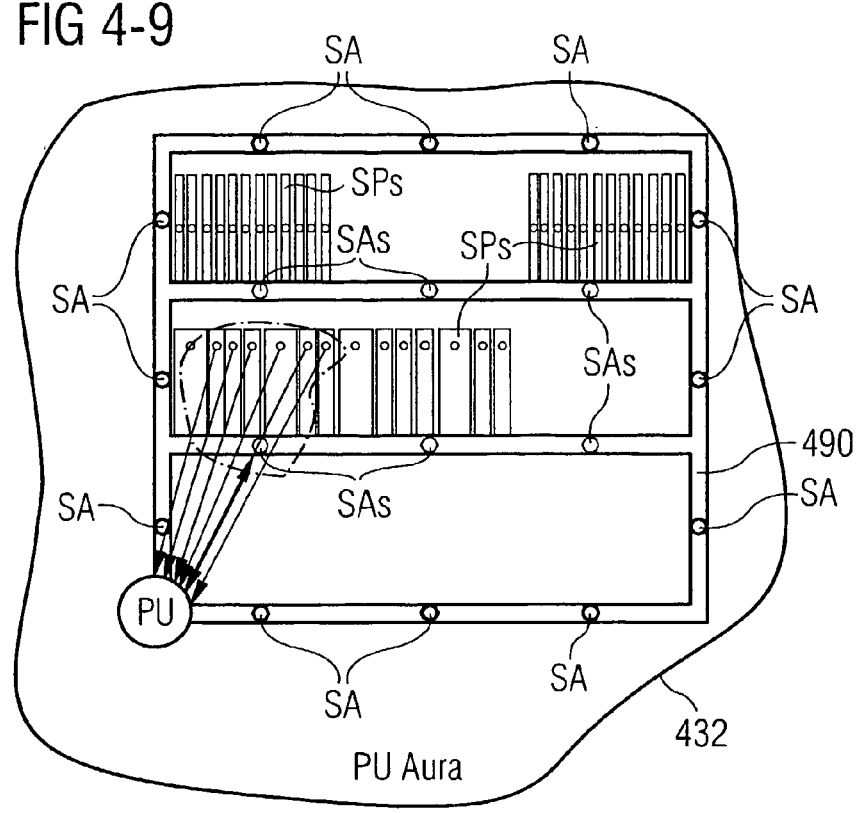
Figures 4, 5, 6, 7, 8, 9, 10:
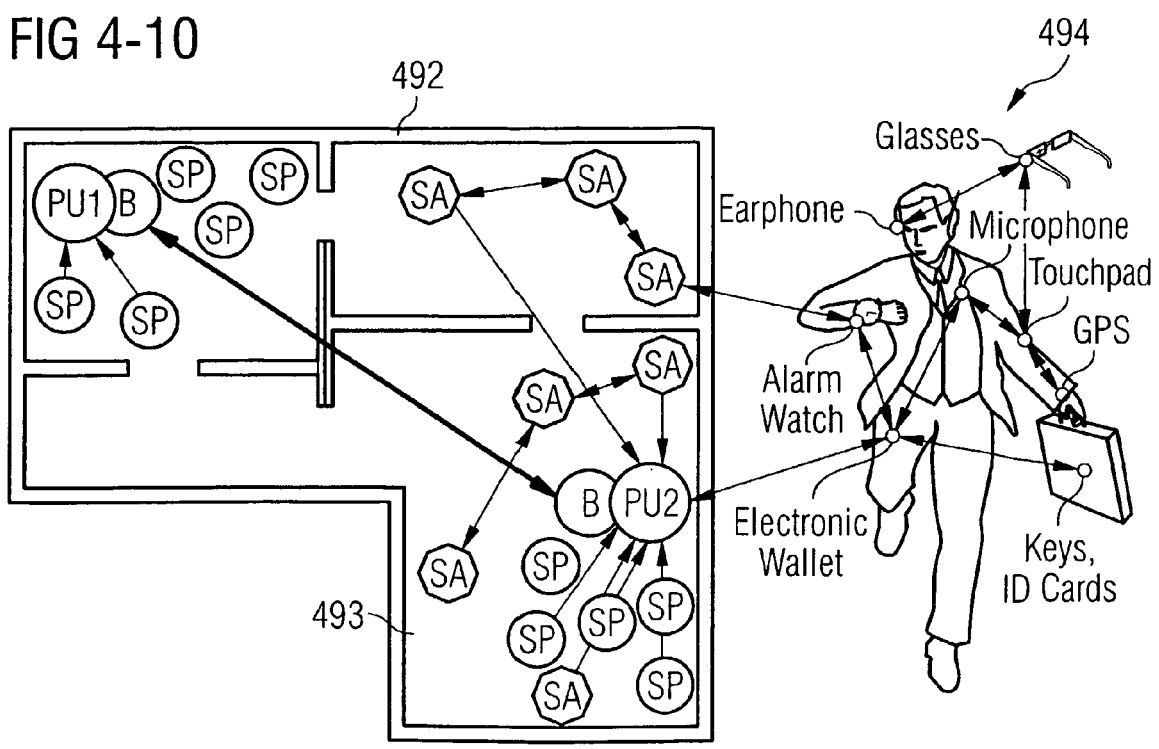
Figures 1, 5:
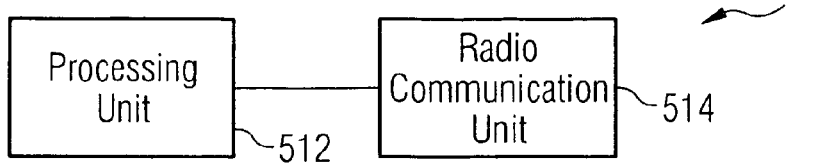
Figures 2, 5:
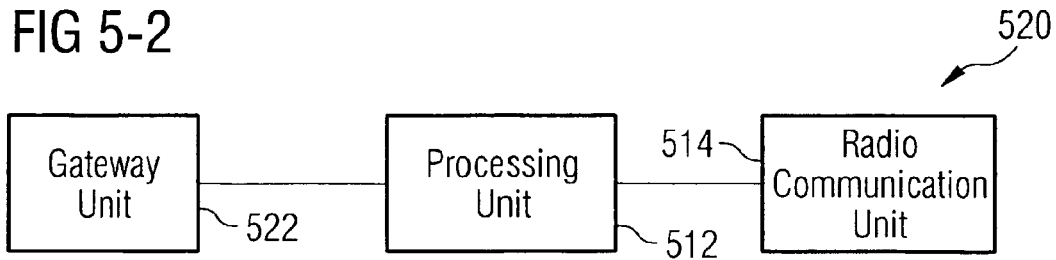
Figures 3, 5:
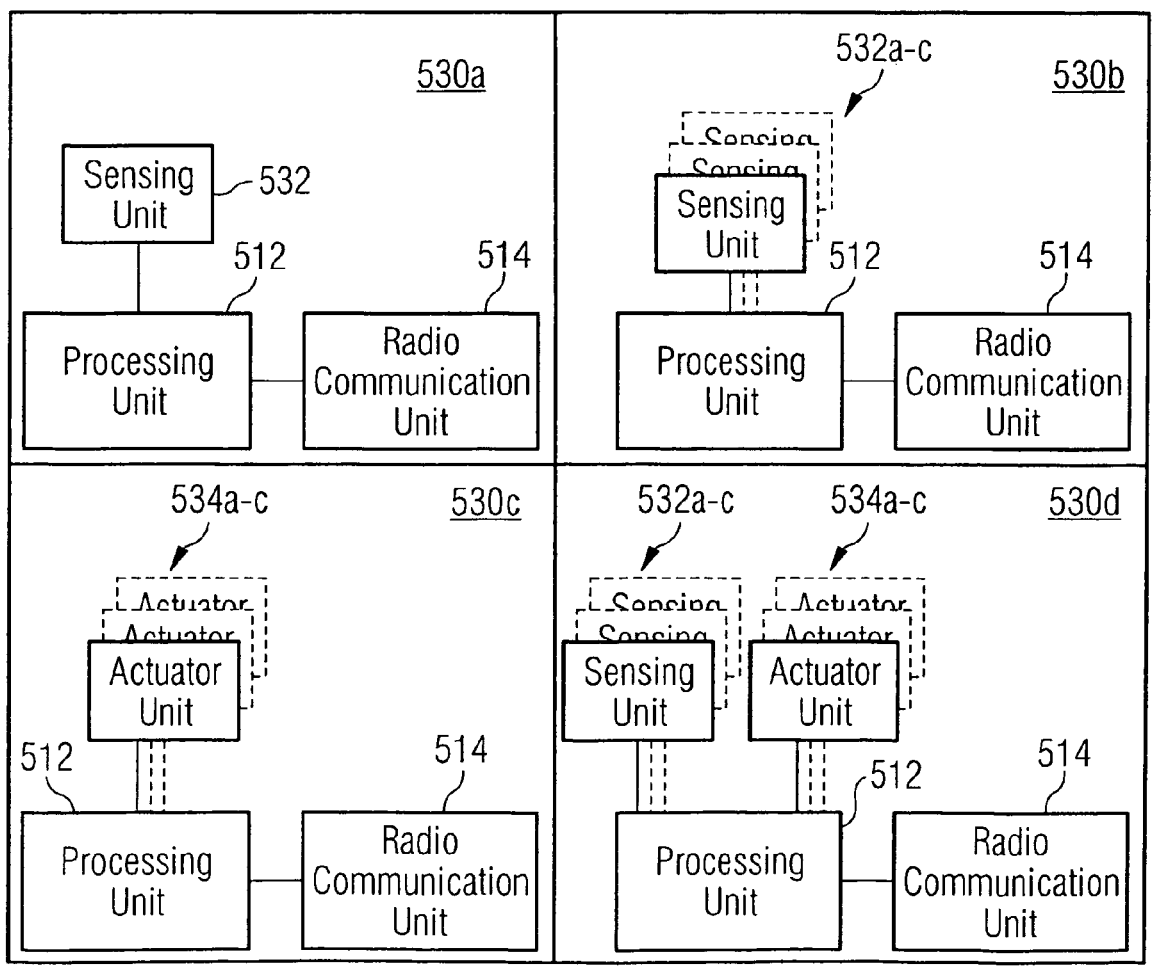
Figures 4, 5:
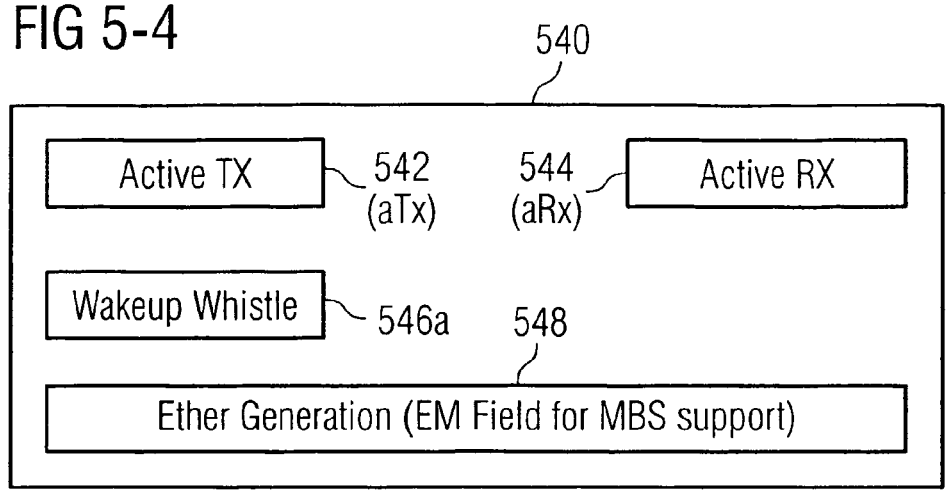
Figure 5:
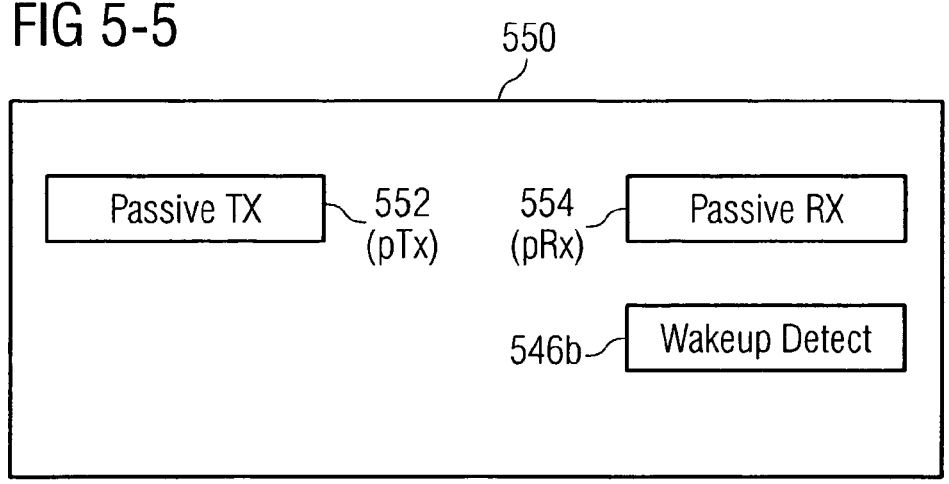
Figures 5, 6:
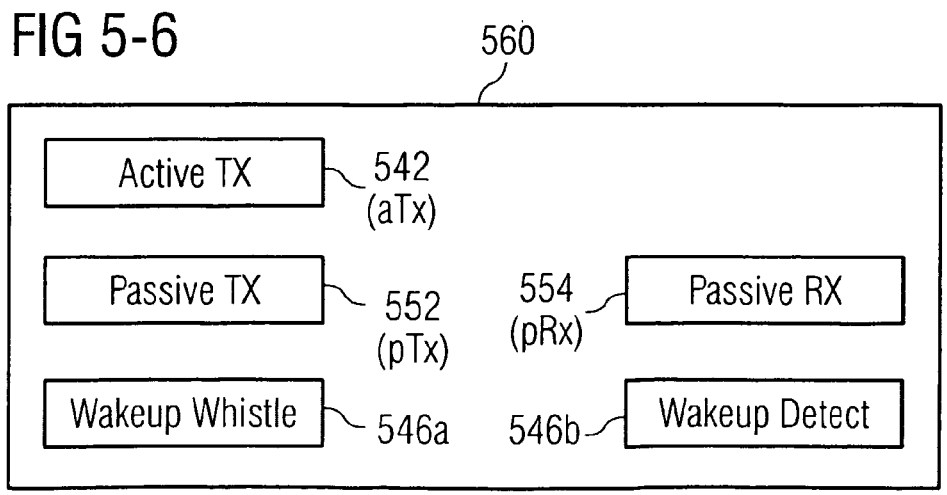
Figures 5, 6, 7:
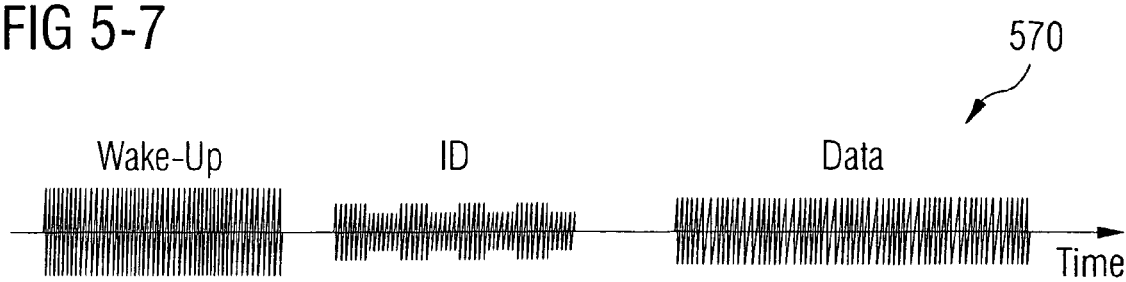
Figures 5, 6, 7, 8:
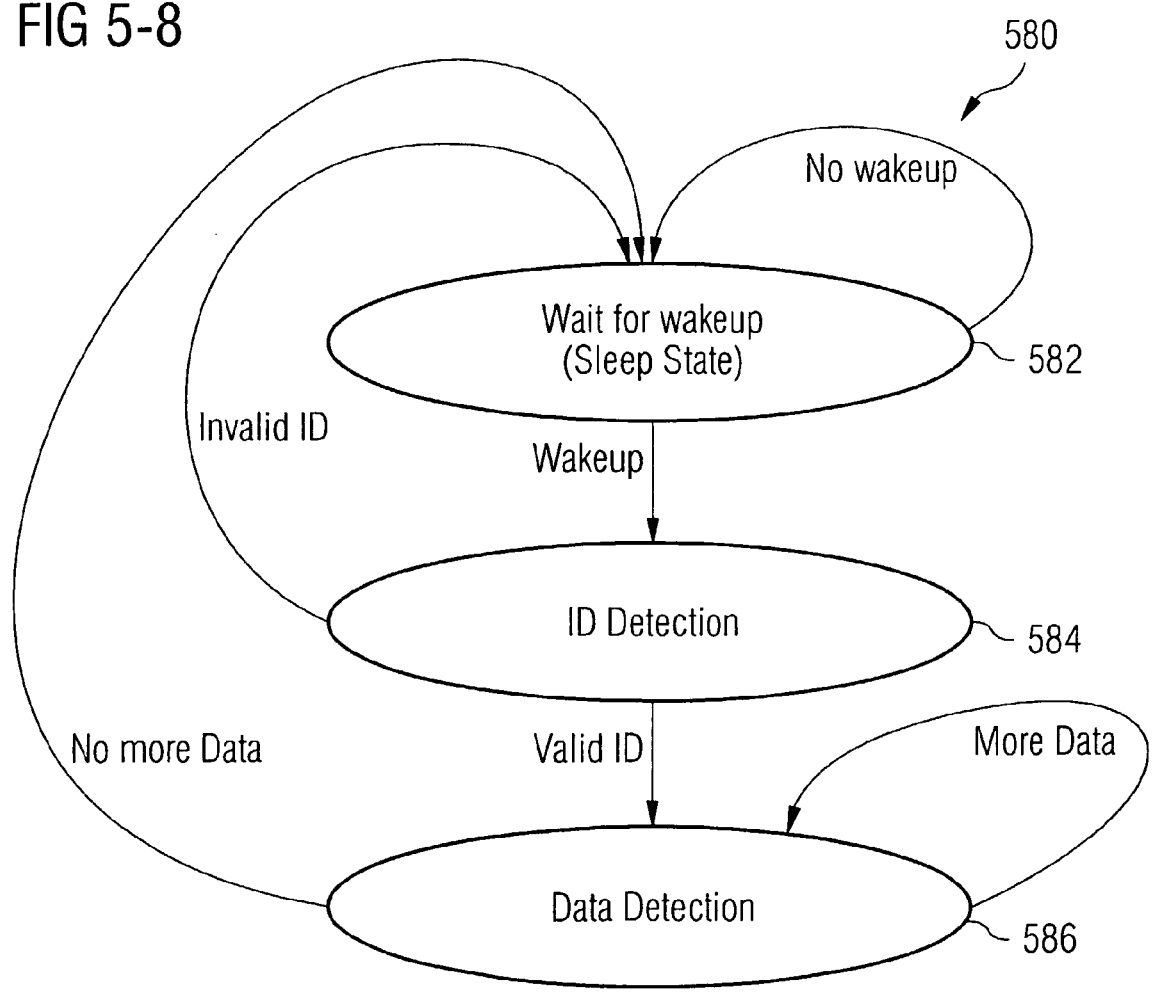

To save power, SAs and SPs are typically in a stand-by mode and activated by a remote wake-up signal received from a PU or SP. FIG. 5-7 is a timing diagram showing the process of stepwisely activating an SP or SA and detecting ID information and control data for executing an application running on said SP or SA.

Once a receiver node detects a such a wake-up signal, it will switch from the stand-by mode to an 'on' mode and receive the signal, which in a second part comprises said ID information. This ID is analyzed, and in case the respective node recognizes its ID it will receive the control data. Otherwise, it will immediately return to the stand-by mode in order to save power. A state transition diagram illustrating the steps of node activation, ID information and control data detection performed by an SP or SA is depicted in FIG. 5-8.

In a heterogeneous network, different devices using different communication techniques are combined together to improve or extend the overall network capabilities. In a WSN according to the present invention, three communication techniques are considered: active-to-active (A2A) communication, active-to-passive (A2P) communication, and modulated backscatter (MBS) communication.

Active-to-active (A2A) communication is the standard active wireless communication where a source is using an active transmitter (aTx) and the destination is using an active receiver (aRx). The symbol used in a WSN for this link is shown in the table depicted in FIG. 1. Since a PU node is the only device in a WSN implementing an active receiver, a PU must always be part of an A2A communication scenario. Active communication from an SA to a PU is also possible. FIG. 2 shows which parts of the communication units need to be activated by each node taking part in an A2A link. The type of data being exchanged and a graphical representation can be taken from FIG. 3.

Active-to-passive (A2P) communication is used to activate and send information to nodes (SPs or SAs) operating a passive receiver (pRx). A passive receiver can be based on an analog diode detector or similar technology that, since it consumes very low power, can be 'on' (listening) all the time, while the digital parts of the receiver are inactive. Therefore, nodes with a passive receiver (pRx) can remotely be activated by nodes having an active transmitter (aTx). The symbol used in a WSN for this link is shown in FIG. 1. FIG. 2 shows which parts of the communication units need to be activated by each node taking part in an A2P link. The type of data being exchanged as well as a graphical representation can be taken from FIG. 3.

One of the features that makes a WSN unique is the use of MBS technology to transmit information. Devices having a passive transmitter (pTx)—SPs and SAs—are able to modulate, with the data they want to transmit, and reflect (backscatter) an electromagnetic field ("Ether", see FIG. 1) received by its antenna. Since the reflected signal is relatively weak, an active receiver (aRx) is necessary to demodulate it. A PU node is the only device in the proposed wireless network which is capable of generating the ether and also the only one implementing an active receiver, so at least one PU must always be part of an MBS communication. A WSN using this technology differs from other existing MBS systems, which use e.g. RFID tags, in the following points:
1. The data being transmitted can be any, not only identification (ID) information. Unlike the fixed, pre-programmed ID, data can be dynamic.
2. The PU providing the ether may not take part in the communication. Instead, it may just provide the channel to make the communication between other two devices possible.
3. The data being transmitted may be received by more than one PU simultaneously.

The symbol used in the wireless network for this link is shown in FIG. 1. FIG. 2 shows which parts of the communication unit need to be activated by each node (a passive backscatter modulator and an active receiver) taking part in an MBS link. The type of data being exchanged and a graphical representation can be taken from FIG. 3.

There are basically two possible scenarios when MBS technology is used in the wireless network, depending on the case whether the PU providing the ether and the one receiving the modulated backscatter signal are the same or different devices.

In the first scenario, only one PU and an SP are involved in an MBS communication. As shown in FIG. 4-1, the process of reading an SP device in a WSN is done in two phases: As an SP node is inactive by default and only its wake-up listener is active, the PU first activates the SP by sending a wake-up signal via an A2P link in an activation phase. In a response phase after having activated the SP the PU starts to generate the ether which is then modulated by the SP with data to be transmitted (identification, dynamic data, e.g. sensor data, etc.). The activation and reception of SP node information can be aggregated in order to reduce the transmission time. This means that during one reading phase multiple SP nodes may transmit information to the PU while the ether is provided.

In the second scenario more than one PU are involved in the MBS transmission. The simplest case is the one represented in FIG. 4-2 with only two PUs and one SP. As in the previous scenario, also two phases are utilized here, but in this case a coordination between the two PUs is also necessary for two reasons: to decide who is going to act as ether provider during the response phase (solutions A and B in diagrams 420a and 420b depicted in FIG. 4-2) and to ensure that the PU not triggering the activation phase has its active receiver (aRx) running at the right time.

As can also be taken from FIG. 4-2, there are three possible solutions for the response phase in this scenario:
1. Solution A: The PU initiating the communication (PU1) is providing the ether and both PUs (PU1 and PU2) are receiving the modulated data sent by the SP (see diagram 420a). For this solution, the coordination phase may only be a notification from the PU providing the ether (Pu1), or even not exist at all.
2. Solution B: The second PU (PU2) is providing the ether and both PUs (Pu1 and PU2) are receiving the modulated data.
3. Solution C: The PU initiating the communication (Pu1) is providing the ether but not interested in the data sent by the SP. Only the second PU (PU2) is receiving that data.

Solution A offers more advantages because it provides data redundancy. The benefits of the other two solutions (B and C) may depend on the specific application or topology, etc.

A first embodiment of the present invention refers to a remote polling and control system in a heterogeneous wireless network as depicted in FIGS. 4-3, 4-5, 4-6 and 4-7. Said system is organized according to the master-slave principle and suitable for ubiquitous communication between a variety of wireless nodes PUs, SAs and/or SPs interconnected via said network, said nodes having an asymmetric complexity and sporadic, asymmetric data transfer requirements. According to the invention, a polling and/or control means PU is provided for polling (S1b) e.g. sensor data detected by remotely accessible nodes of a first type (SPs) located anywhere in said network and/or remotely activating (S1c), controlling (S1c') and/or deactivating (S1c") functions executable by remotely controllable nodes of a second type (SAs). Thereby, said nodes (SAs and SPs) are in a stand-by mode before and after being triggered by said polling and/or control means.

Said polling and/or control means PU, which acts as a master node, comprises an RF transceiver (aTx and aRx) for sending (S0a) a wake-up signal to at least one remote slave node SP or SA of a first or second type, respectively, for polling (S0b) information sensed by said slave node SP, sending (S0c) control information for triggering a function to be executed by at least one remotely controllable slave node SA of a second type and receiving (S0d) feedback information from said slave nodes SA and/or SP as shown in the flow chart depicted in FIG. 6-1. Said master node PU can be connected to a bridge B providing a wireless or wired communication link to at least one other master module PU'.

According to the invention, a remote slave node of said first type (SP) comprises receiving means pRx for wirelessly receiving (S2a) a wake-up signal indicating a need for transmitting a polling request message from said master node PU to said slave node SP and transmitting means pTx for wirelessly transmitting (S2b) sensor data or requested status information to said master node PU upon reception of said polling request message by backscattering an RF signal obtained by modulating an electromagnetic field provided by said master node PU or any other node with an encoded signal representing said status information.

The remotely controllable slave node SA of said second type comprises receiving means pRx for wirelessly receiving (S3a) a wake-up and remote control signal from the master node PU, optional sensor elements SSA for detecting (S3b) operational parameters of said slave node SA and/or environmental data and/or remotely controllable actuator elements ASA for executing (S3c) programmable actions, processing means for executing (S3d) a remotely controllable application running on said slave node SA for monitoring (S3e) and gathering (S3e') sensor data detected by said sensor elements SSA and/or controlling (S3e") said actuator elements ASA, and transmitting means aTx for wirelessly transmitting (S3f) feedback information from said application to said master node PU upon reception of said wake-up and remote control signal.

According to a further embodiment of the invention, said remotely controllable slave node of said second type (SA) additionally comprises transmitting means pTx for wirelessly transmitting (S3g) sensor data or requested status information upon reception of a polling request message from a further node SA' by backscattering an RF signal obtained by modulating an electromagnetic field provided by said master node PU or any other node with an encoded signal representing said status information to said further node SA' when communicating with said further node SA' on a peer-to-peer basis. In a meshed scenario said node SA can also use its active transmitter aTx to communicate to the further node SA', the latter using its passive receiver pRx'.

According to one embodiment of the invention, nodes in said network can be organized in a star or meshed topology or a combination of both, based on the types of nodes being used as well as the respective deployment scenario in a self-organizing, ad-hoc manner. SP nodes can only be deployed in a star topology as they are not able to initiate a communication on their own. Furthermore, they need a PU to be able to transmit their data. The PU acts as the center of the star topology as shown in FIG. 4-3. The area a PU ether covers with its active transmitter (aTx) is called "aura" (see reference number 432 used in FIG. 4-3). A PU can only demodulate MBS signals if they are coming from an SP or SA within its aura. Moreover, the wake-up whistler only works with devices inside the aura of the PU.

According to the present invention, a PU is responsible of polling the SP and SA nodes within its range by using an interrogation algorithm that is executed periodically. The PU may uniquely address a single SP or globally broadcast all the SPs in its aura to answer. In the first case, the SP requested will answer immediately, but in the second case a distributed anti-collision algorithm running in the SPs must control that the access to the medium is done in an organized way. A third option could be to address only SPs with common features (e.g. only temperature sensors) by coding the SP type as a part of its own address (capability awareness). A simple example of how this algorithm could work is using a different waiting time (timeout) in every SP before any data are transmitted (see timers $T_1$ to $T_5$ in the message sequence chart depicted in FIG. 4-4). To ensure this waiting time is different in every SP, a unique internal number (e.g. network address) can be used to calculate the timeout.

As shown in FIG. 4-5, SA nodes are able to communicate with each other by using A2P links. Before any data are transmitted, an SA sends a wake-up signal to activate the nodes to which it wants to transmit data. This deployment is adequate for scenarios where the presence of a PU can not be granted, as e.g. in a body area network (BAN) scenario (see FIG. 4-5) or other type of small mobile network deployments.

A more general WSN scenario can be a combination of both star and mesh topologies where A2A links are used to coordinate two or more PUs or to connect a group of SAs running a meshed topology with the rest of the network via a PU. SA-to-SP communication is also considered, e.g. in case the SP nodes are actuators (switches, displays, etc.) or for management purposes. The network can also be extended by using the bridge modules (B) of the PUs (see FIG. 4-6).

It is worth to note that the A2A links in an SA-to-PU communication are unidirectional links. Therefore, an SA using this kind of link may be in three different situations:

1. The SA is within the range of one PU: If the PU has already made a polling of its aura 432, the SA knows that it is close to one PU and may want to use its active transmitter (aTx) to initiate a communication (e.g. an alarm) requesting a confirmation from the reception side. The PU can then selectively wake-up this SA and use an A2P link to send an acknowledgment (ACK) message back to the SA (see No. 1 in FIG. 4-7).
2. The SA is out of the immediate range of one PU but can reach the PU by doing some hops through other SAs. With the neighbors' information received from other nodes, the SA knows that a PU is close but not enough to receive data directly from it. The SA tries to use its active transmitter to send data to that PU. When a PU receives data and a receipt confirmation request from a SA that is out of its aura 432, it tries to send an ACK message by using multihopping via a known path or discovering a new one to that SA. (It should be noted that this path may go not only through SAs but also through PUs.) While the SA receives the ACK message, it knows that it is possible to use an asymmetric bidirectional link with that PU (see Nos. 2 and 3 in FIG. 4-7).
3. The SA is out of range and can not reach a PU except by using its active transmitter (see No. 4 in FIG. 4-7). In this case, the communication is unidirectional. The SA may periodically transmit its data, which will be received by the PU but without any confirmation about successful reception from the PU received at the SA passive receiver side.

The present invention thus pertains to a method for enabling at least one master node PU of a remote polling and control system 430, 450, 460 or 470 in a heterogeneous WSN as described above to remotely control at least one slave node SA or SP. As shown in the flow chart depicted in FIG. 6-2, said master node PU performs the step of transmitting (S1a) a wake-up and control signal for polling (S1b) data detected, created and/or processed by a remotely accessible slave node SP of a first type located in the range of said master node PU or any other node providing an electromagnetic field to be modulated by said slave node SP and/or remotely activating (S1c), controlling (S1c') and/or deactivating (S1c") functions executable by a slave node of a second type (SA), said slave nodes (SA and SP) being in a stand-by mode before and after being called by the master node PU.

The slave node of said first type (SP) thereby performs the steps of wirelessly receiving (S2a) a wake-up signal indicating a need for transmitting a polling request message from said master node PU to said slave node SP and wirelessly transmitting (S2b) data or requested status information to said master node PU upon reception of said polling request message by backscattering an RF signal obtained by modulating an electromagnetic field provided by said master node PU or any other node with an encoded signal representing said information (cf. FIG. 6-3).

The slave node of said second type (SA) performs the steps of wirelessly receiving (S3a) digitally encoded polling and/or control information from said master node (109), after having detected (S3a') a valid identification code of said master node PU in the header of the received polling and/or control information, executing (S3d) a remotely controllable application running on said slave node SA for monitoring (S3e) and gathering (S3e') operational parameters of said slave node SA and/or environmental data detected by sensor elements SSA connected to said slave node SA, in the following referred to as "status information", and/or controlling (S3e") actuator elements ASA controllable by said slave node SA, and wirelessly transmitting (S3f) a digitally encoded version of said status information as a feedback signal to the master node (cf. FIG. 6-4a).

While not being in vicinity of a master node PU, the slave node of said second type (SA) performs the step of wirelessly transmitting (S3f) feedback information from an application running on said slave node SA to a further node SA' upon reception of a wake-up and/or remote control signal from said further node SA'. Otherwise (while in the vicinity of a master node PU), said slave node SA performs the step of wirelessly transmitting (S3g) data or requested status information upon reception of a polling request message from the master node PU by backscattering an RF signal obtained by modulating an electromagnetic field provided by said master node PU with an encoded signal representing said status information to said master node (cf. FIG. 6-4b).

According to the invention, nodes in a WSN can use a listen-before-talk mechanism to get access to the physical medium. A simplified version of CSMA/CA is a valid option. The PUs are the nodes demanding more channel use, so some kind of negotiation between these devices is considered to avoid collisions. Since in a WSN different types of nodes with different communication capabilities and needs are sharing the same channel, a separate analysis for each type of node is more suitable.

As SPs do not implement an active transmitter (aTx), their transmission has to be managed by a PU, which is transmitting the ether the SPs need for communication. The only medium access problem appears when more than one SP is required by a PU to transmit data. To avoid multiple backscatter signals being received in the PU's receiver at the same time, an anti-collision algorithm is utilized. The algorithm may run completely in the SP, working in a fully distributed manner, or may run partially in the SPs and the PU which is performing the data request.

An SA may need access to the medium to talk with another SA or with a PU. In the first case, the SA first listens the medium. If it is free, the SA just sends a wake-up signal selecting the destination SAs, followed by the data it wants to transmit. If the medium is busy, the SA will backoff for some time before trying again.

When talking with a PU, an SA may use an MBS link if the SA is inside a PU's aura 432. Sending data by using an MBS link works in the same way as for the SP nodes. If the SA is outside the PU's aura 432, it may use either A2P links enabling a multi-hopping via other SA nodes or an A2A link (see FIG. 4-7) to the PU directly.

In the second case, the A2A link only works if the active receiver in the PU side and the active transmitter in the SA side are synchronized in time and tuned in frequency. As the PU node preferably has its active receiver off when it is not transmitting for saving power, the SAs out of the PU's aura 432 must then be informed at least about the frequency the PU's active receiver (aRx) is using and when the PU will have its active receiver on again. This is done in the PU by broadcasting a beacon 482 with this information. This beacon may also be retransmitted by each SA, e.g. by using their neighbor lists, to cover a wider area. To use the A2A link, the SA uses also a listen-before-talk mechanism (e.g. CSMA/CA) and transmits only when the medium is free.

The PU is the most complete node in a WSN and also the one that will make a more intensive use of the physical medium. Depending on the deployed topology, it may need to manage up to six types of communication: A2A links with other PUs, A2A links from SAs, A2P links to activate SPs or SAs, MBS links to read signals coming from the passive receivers SPs or SAs, provide the ether for the MBS links, or long links using a PU's bridge module (B). The medium access in a PU is also preferably based on a listen-before-talk mechanism (e.g. CSMA/CA), similar to the one used in the SAs nodes.

Each PU in a WSN is responsible for polling (interrogating) all the SPs and SAs within its aura 432. During this polling procedure the PU must synchronize the utilization of its active transmitter (aTx), active receiver (aRx) and electromagnetic field generator (ether provider). The PU divides the polling time into two phases (see FIG. 4-8):

1. Selection phase (reference number 484): In this phase the PU generates the wake-up signals for the nodes it wants to interrogate. The PU may select all the nodes in its aura 432 (broadcast wake-up), a group of nodes sharing common characteristics (multicast wake-up) or a specific node (unicast wake-up) to answer the request.
2. Response phase (reference number 486): During this phase said PU generates an electromagnetic field (ether) to be modulated with the data from the SPs and SAs. As already mentioned above, an anti-collision algorithm (CSMA/CA) should preferably be used.

When the number of passive nodes to interrogate is high, the polling procedure uses the channel for relatively long time compared with the duration of a peer-to-peer transmission. To avoid collisions with other PUs in its vicinity, a PU transmits a beacon 482 at the beginning of the polling time (see FIG. 4-8). This beacon informs other PUs, among other things, about the duration of the polling procedure and optionally about the frequency/channel occupancy. PUs receiving the beacon will backoff for at least the polling time duration before trying to get access to the medium again. PU nodes in close vicinity may also be able to share the medium by using different radio frequencies, however, in this scenario a suitable protocol must ensure that an SP or SA node is not interrogated at the same time from two different PUs.

To illustrate how the mixed topology can be applied to a real scenario, two examples of using WSNs shall be presented in the following. The first one is a "smart bookshelf" 490 where a WSN is used to identify which books are in its shelves and even to provide some information about their positions in the bookshelf (see FIG. 4-9). The second example illustrates how a WSN deployed in a body area network (BAN) can automatically be linked to another WSN deployed in the home of the BAN's user (see FIG. 4-10).

In the smart bookshelf example a user has deployed several SAs around a bookshelf 490 that will be used as reference points to locate the SPs which are attached to the books (CDs, video tapes, etc.) in the shelves (see FIG. 4-9). Moreover, a PU needs to be part of the scenario and located close enough to the bookshelf 490 such that the latter is at least inside the PU's aura (ether range) 432. The PU may operate in the following way:

1. First, The PU polls all the nodes within its aura 432 and identifies and classifies the nodes as SAs and SPs, respectively.
2. Afterwards, the PU individually scans a first SA by requesting it to send short-range wake-up signals to the SPs in its vicinity. The PU then generates the ether and reads the data backscattered from all SPs woken up by the respective SA.
3. This procedure is then repeated for every SA detected in step 1.
4. After some data processing, the PU can provide information about which SPs are in the bookshelf and close to which SAs they are.

By this procedure the system is able to detect objects on the shelf in step (1) and subsequently detect proximity relationships between the objects in steps (2) to (4).

Alternatively, the procedure can be stopped after step (1) if the observer is only interested in whether a desired media is located at the shelf at all and does not need any further fine-grained proximity information.

The problem outlined in FIG. 4-10 is how to link two parts of the same WSN: a WSN home network 493 and a "takeaway WSN" or BAN 494. This link is automatically established when a user enters his/her home and walks close to some SA or PU nodes of the WSN home network 493. From the network point of view there is no difference between these two versions of a WSN.

The main advantageous differences of the proposed approach according to the present invention can be summarized as follows:

The invention provides an integrated network topology for wireless networks, especially for high-density wireless sensor networks with heterogeneous node classes. It thereby allows different types of wireless nodes to be integrated in the network (simple and/or complex, low-power and/or medium-power nodes). Furthermore, the invention provides a specific radio technology based on the usage of active and passive transmitters and receivers for different types of nodes and communication links within the network, thereby using the principle of "always-on" receivers in selected nodes of the network in order to simplify radio and protocol complexity in each of the nodes and in the entire network. Finally, a unique wake-up signaling scheme is provided to activate nodes or a single node when required, e.g. for requesting data from the activated node or indicating a need to send data to the activated node.

The overall network topology, different node classes with different radio technologies employed, enabling different communication links/features and the unique wake-up signaling scheme (for stepwise node receiver activation) allow the deployment of high-density heterogeneous wireless networks in a wide variety of new application areas (including sensor network applications).

TERMS AND DEFINITIONS

| | |
|---|---|
| Active Receiver (aRx) | A node having a down-conversion chain for demodulating received RF signals. |
| Active Transmitter (aTx) | A node employing a wireless transmission technique, thereby generating and modulating RF signals for conveying information to one or a multiplicity of other nodes within a wireless network. |
| Carrier | A radio frequency (RF) signal generated by a PU unit to transmit energy to the SP/SA and retrieve data from a node. |
| CSMA | CSMA (Carrier-Sense Multiple Access) is a radio access scheme where the occupancy of the carrier is measured and detected before utilization of the medium to reduce the probability of collisions and subsequent data loss or need for data retransmission. |
| MBS | MBS (Modulated Backscatter) is a radio transmission technology wherein a node is modulating a radio carrier provided by another node. Instead of creating radio energy, the information-emitting node modulates externally provided radio energy (by modulating an electromagnetic field). |
| Passive Receiver (pRx) | A node equipped with a detecting means that does not require an active conventional radio down-conversion chain, thus consuming almost no power. For wake-up whistle reception preferably a diode detector can be utilized whose detection sensitivity and selectivity are limited. |
| Passive Transmitter (pTx) | A node equipped with a radio interface capable of modulating an external electromagnetic field which provides a modulated reflection of a radio wave, thus conveying information to a remote node (or multiple remote nodes). |
| Reader (RFID) | A microcontroller-based unit with a wound output coil, peak detector hardware, comparators, and firmware designed to transmit energy to a tag and read information back from it by detecting the backscatter modulation, which is limited to operation at 13.56 MHz. By contrast, the proposed system is operated at 2.4 GHz, uses a planar antenna instead of a coil and a modulation scheme suitable for MBS (e.g. DPSK-OOK). |
| RFID Tag | An RFID device incorporating a memory chip (usually with an on-board rectification bridge and other RF front-end devices), a wound or printed input/output coil, and (at lower frequencies) a tuning capacitor. |

The invention claimed is:

1. A heterogeneous wireless data transmission network comprising:
   a first master node;
   a second master node;
   a passive slave node including a first passive receiver and a first passive transmitter configured to modulate and reflect external RF signals, said passive slave node being configured to transmit data to the first master node by modulated backscatter (MBS) communication using the first passive transmitter; and
   an active slave node including a second passive transmitter configured to modulate and reflect external RF signals and a first active transmitter configured to transmit a modulated signal independently, said active slave node being configured to transmit data to the passive slave node using the first active transmitter, wherein
   one of the first and second master nodes is configured to wake up the passive slave node or the active slave node from a sleep state at any time by transmitting a wake-up signal to the passive slave node or the active slave node,
   the first passive receiver is configured to receive the wake-up signal and the first passive transmitter is configured to transmit data after the passive slave node is woken up from the sleep state,
   the second master node is configured to provide an electromagnetic field to allow MBS communication and does not take part in the MBS communication while providing the electromagnetic field, and
   only the first master node is configured to receive the data from the first passive transmitter when the second master node provides the electromagnetic field.

2. The network according to claim 1, wherein the active slave node is configured to wake up the passive slave node or another active slave node from the sleep state at any time by transmitting the wake-up signal to the passive slave node or the another active slave node.

3. The network according to claim 1, wherein at least one of the first and second master nodes further comprises:
   a second active transmitter configured to transmit data to a first active receiver of the active slave node.

4. The network according to claim 1, wherein the passive slave node further comprises:
   a processing unit configured to process and create dynamic data for transmission by the first passive transmitter.

5. The network according to claim 1, wherein the passive slave node includes a power supply.

6. The network according to claim 5, wherein the active slave node further comprises:
   a sensor element configured to detect operational parameters of the active slave node or environmental data.

7. The network according to claim 6, wherein the passive slave node or the active slave node further comprises:
   a remotely controllable actuator element configured to execute programmable actions.

8. The network according to claim 7, wherein the passive slave node or the active slave node is configured to transmit data to the first master node by modulating and reflecting an external signal transmitted from the second master node.

9. The network according to claim 8, wherein
   the wake-up signal further includes identification information,
   the passive slave node or the active slave node is configured to switch from the sleep state to an identification information detection state upon reception of the wake-up signal,
   the active slave node or the passive slave node, in the identification information detection state, is configured to switch to a control data reception state for receiving control data when the wake-up signal includes identification information identifying the active slave node or the passive slave node, respectively, and
   the active slave node or the passive slave node, in the identification information detection state, is configured to switch to the sleep state if the wake-up signal does not include said identification information identifying the active slave node or the passive slave node, respectively.

10. The network according to claim 9, wherein the identification information includes an identifier of the passive slave node or the active slave node.

11. The network according to claim 9, wherein the identification information identifies a group of passive slave nodes or a group of active slave nodes.

12. The network according to claim 9, wherein the identification information identifies all passive slave nodes or all active slave nodes.

13. The network according to claim 9, wherein the passive slave node or the active slave node power consumption is smaller in the sleep state than in the identification information detection state and is smaller in the identification information detection state than in the data control reception state.

14. The network according to claim 1, wherein the network is configured in a hybrid star or meshed topology.

15. The network according to claim 1, wherein at least one of the first and second master nodes includes a bridge that provides a wireless or wired communication link to at least the other master node.

16. The network according to claim 1, wherein the active slave node comprises a second passive receiver, wherein at least one of the first and second master nodes further comprises:

an active receiver that has a higher power consumption and sensitivity than the first passive receiver in the passive slave node or the second passive receiver in the active slave node, and the first passive receiver in the passive slave node or the second passive receiver in the active slave node has a lower power consumption and sensitivity than the active receiver in the at least one of the first and second master nodes.

* * * * *